(12) United States Patent
Kawada et al.

(10) Patent No.: US 11,824,419 B2
(45) Date of Patent: Nov. 21, 2023

(54) DRIVE DEVICE HAVING DRIVE TRANSMISSION DEVICE

(71) Applicant: DENSO CORPORATION, Kariya (JP)

(72) Inventors: Shinji Kawada, Kariya (JP); Toshihisa Nakajima, Kariya (JP); Shin Sen, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/828,771

(22) Filed: May 31, 2022

(65) Prior Publication Data

US 2022/0294328 A1 Sep. 15, 2022

Related U.S. Application Data

(63) Continuation of application No. PCT/JP2020/044545, filed on Nov. 30, 2020.

(30) Foreign Application Priority Data

Dec. 6, 2019 (JP) .................................. 2019-221191
Aug. 25, 2020 (JP) .................................. 2020-141639

(51) Int. Cl.
*H02K 49/10* (2006.01)
*H02K 7/11* (2006.01)

(52) U.S. Cl.
CPC ............. *H02K 49/102* (2013.01); *H02K 7/11* (2013.01); *H02K 49/108* (2013.01)

(58) Field of Classification Search
CPC .. H02K 9/00; H02K 9/04; H02K 7/00; H02K 7/10; H02K 7/18; H02K 49/00;
(Continued)

(56) References Cited

U.S. PATENT DOCUMENTS 3,354,833 A    11/1967   Laing
4,896,754 A *   1/1990   Carlson ................ H02K 49/104
                                                    464/29
6,841,910 B2 *   1/2005   Gery .................... H02K 49/106
                                                    310/156.43

FOREIGN PATENT DOCUMENTS

DE       102015223338 A1    6/2017
JP        H08152075 A       6/1996
(Continued)

*Primary Examiner* — Tran N Nguyen
(74) *Attorney, Agent, or Firm* — Harness, Dickey & Pierce, P.L.C.

(57) ABSTRACT

A drive transmission device includes a drive-side rotatable body, a plurality of magnetic conducting portions and a driven-side rotatable body. The drive-side rotatable body includes a plurality of magnetic poles arranged in a rotational direction. The magnetic conducting portions are magnetizable by the magnetic poles of the drive-side rotatable body. The driven-side rotatable body has a plurality of magnetic poles configured to be rotated in response to rotation of the magnetic poles of the drive-side rotatable body through the magnetic conducting portions. The drive transmission device is configured to be operated as a magnetic speed changer that changes a speed of rotation between the drive-side rotatable body and the driven-side rotatable body by differently setting the number of the magnetic poles of the drive-side rotatable body, the number of the magnetic conducting portions and the number of the magnetic poles of the driven-side rotatable body from each other.

16 Claims, 21 Drawing Sheets

(58) Field of Classification Search
CPC .... H02K 49/10; H02K 49/102; H02K 49/108; H02K 51/00; F16H 49/00; F16H 49/02; F16H 49/10; F16K 11/00; F16K 11/07; F16K 31/00; F16K 31/04; F25B 41/00; F25B 41/04

See application file for complete search history.

(56) References Cited

FOREIGN PATENT DOCUMENTS

| | | | | |
|---|---|---|---|---|
| JP | H08312821 A | 11/1996 | | |
| JP | H0972449 A | 3/1997 | | |
| JP | 2001095227 A | 4/2001 | | |
| JP | 2003244931 A | 8/2003 | | |
| JP | 2007074900 A | * 3/2007 | ............ | H02K 49/10 |
| JP | 2009281497 A | 12/2009 | | |
| JP | 2010106940 A | 5/2010 | | |
| JP | 4824967 B2 | 11/2011 | | |
| JP | 2016533706 A | 10/2016 | | |
| JP | 2018078777 A | 5/2018 | | |

* cited by examiner

FIG. 3
(a)
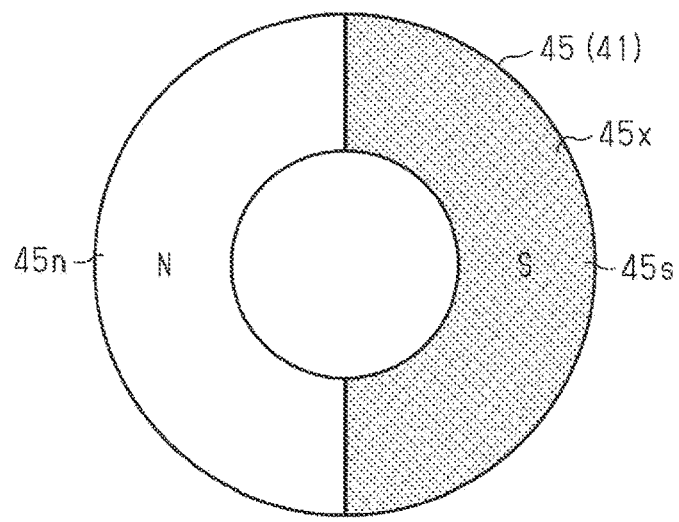
(b)
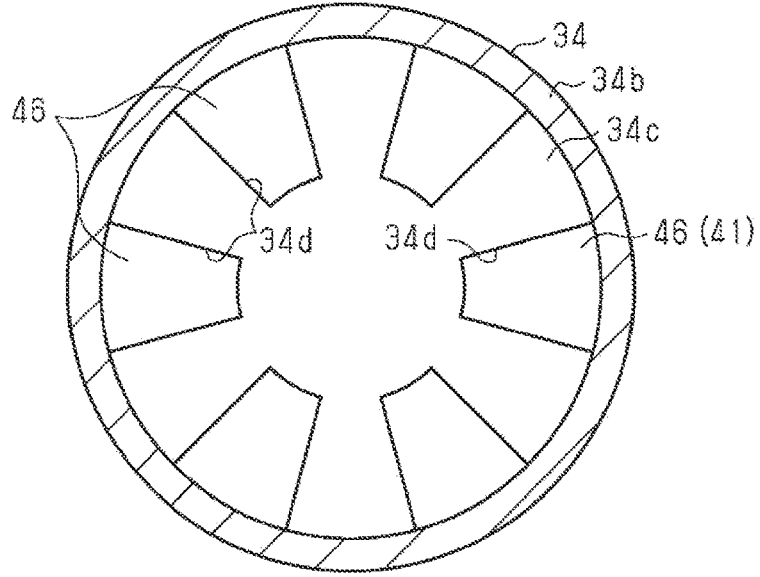
(c)
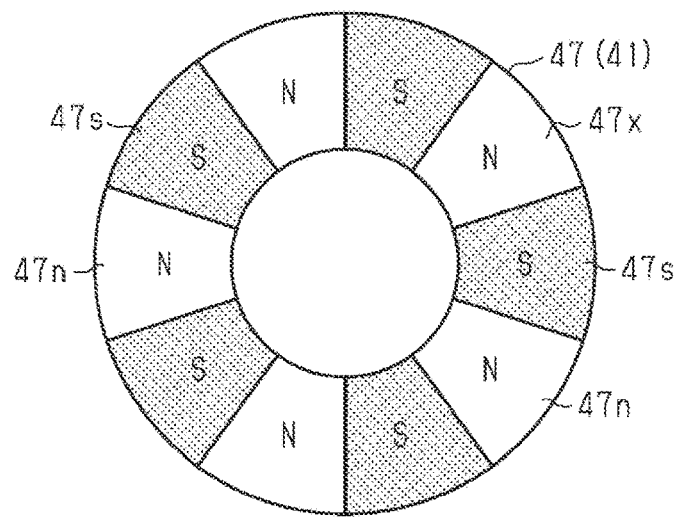

FIG. 5
(a)
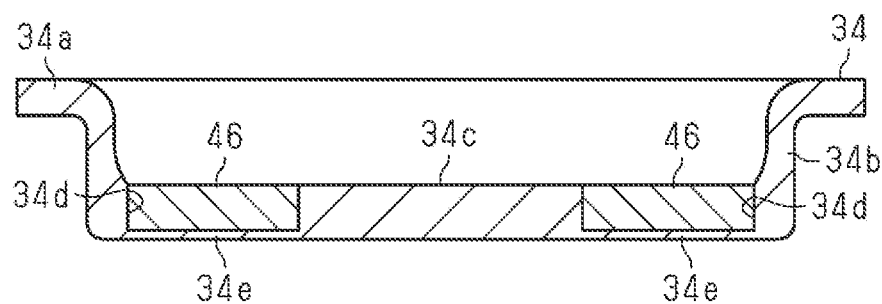
(b)
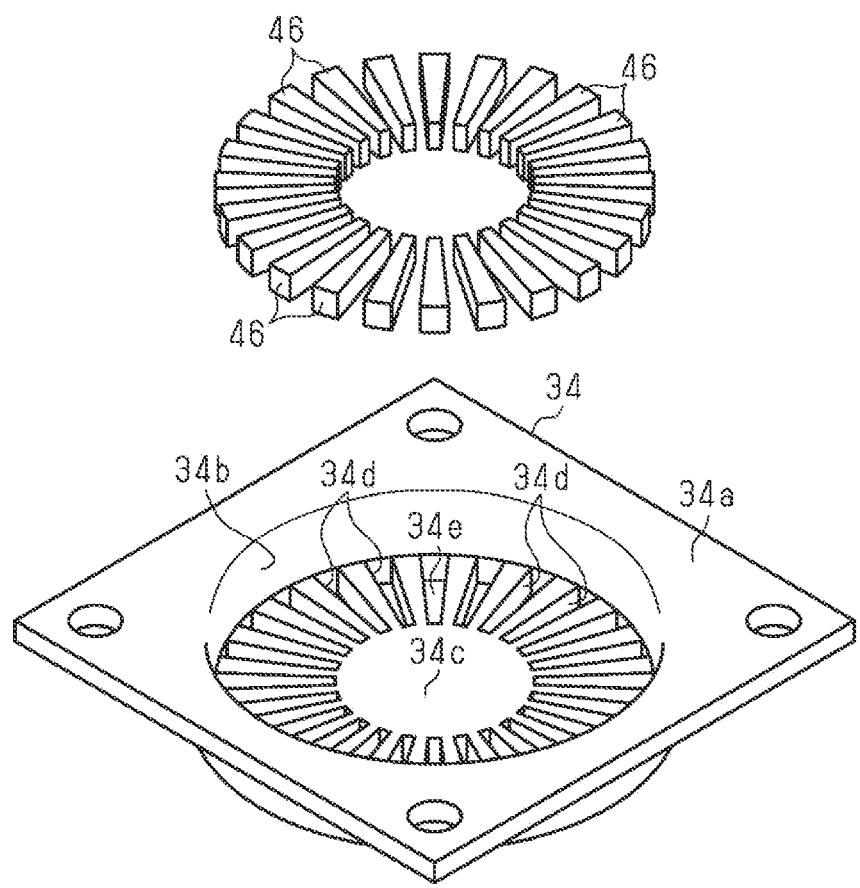

FIG. 6
(a)
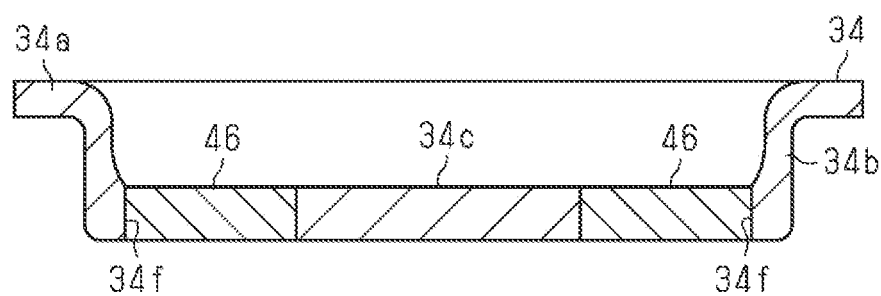
(b)
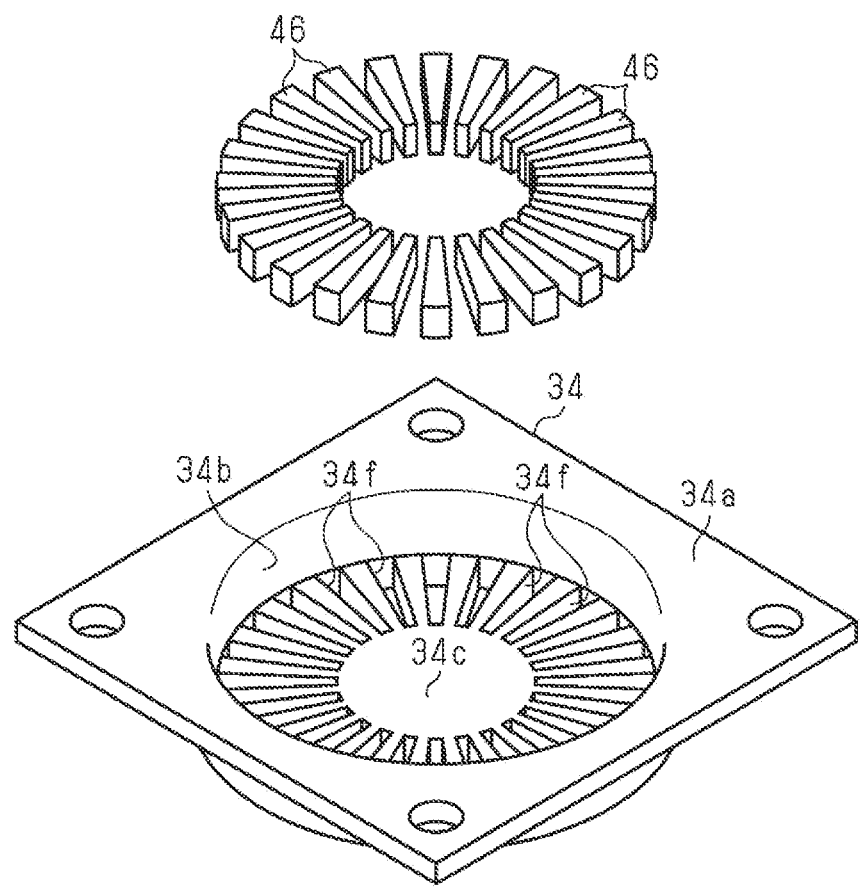

FIG. 10
(a)
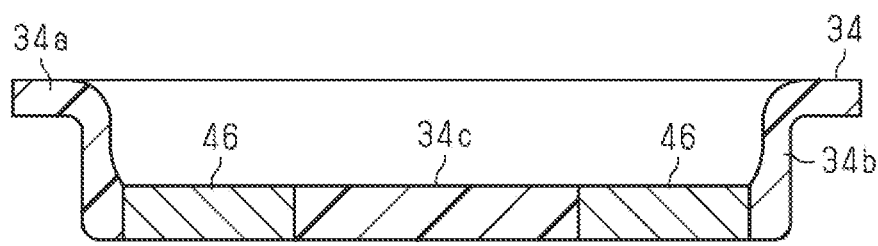
(b) RESIN INFLOW
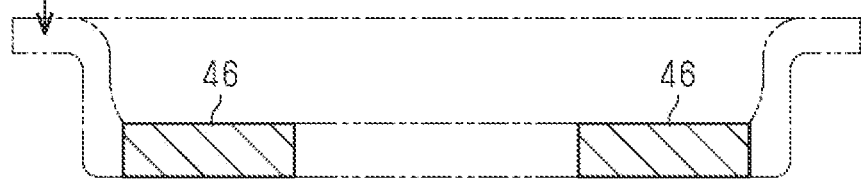
FIG. 11
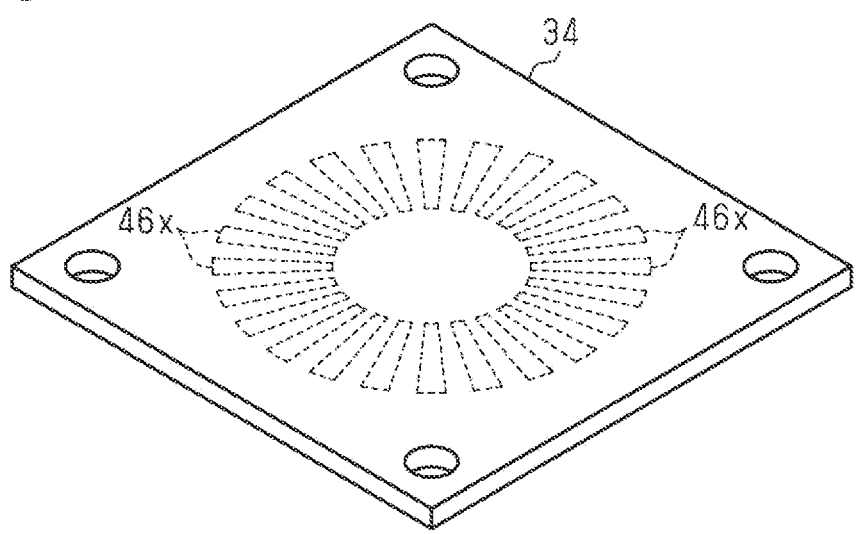

FIG. 12
(a)
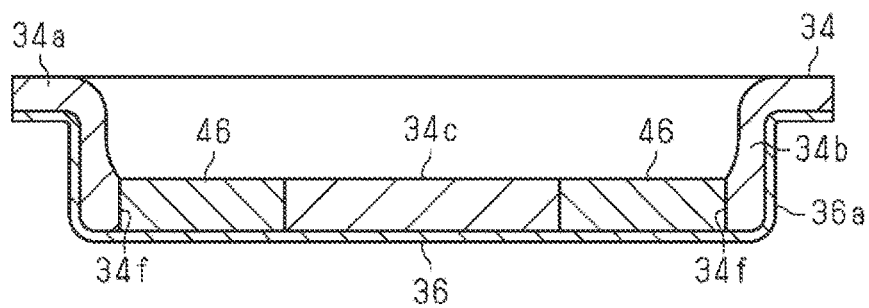
(b)
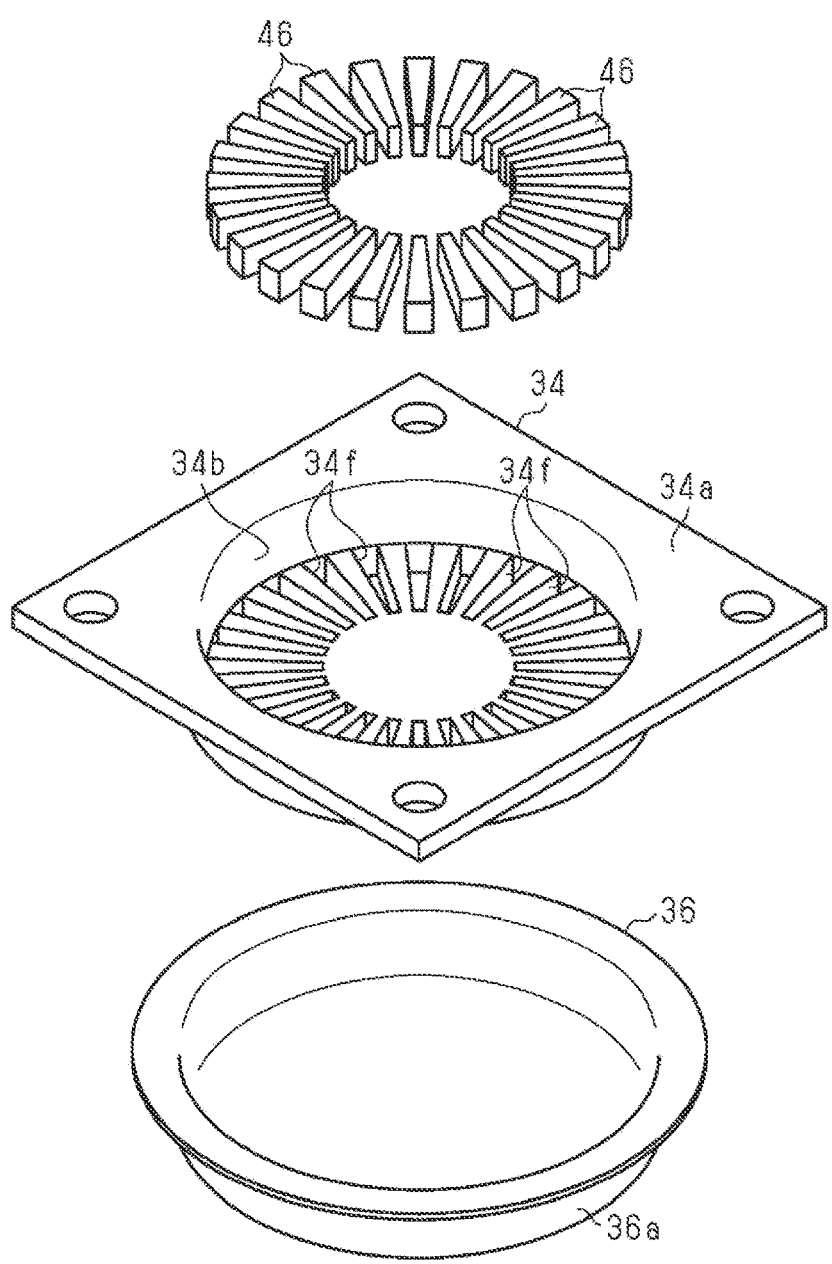

FIG. 13
(a)
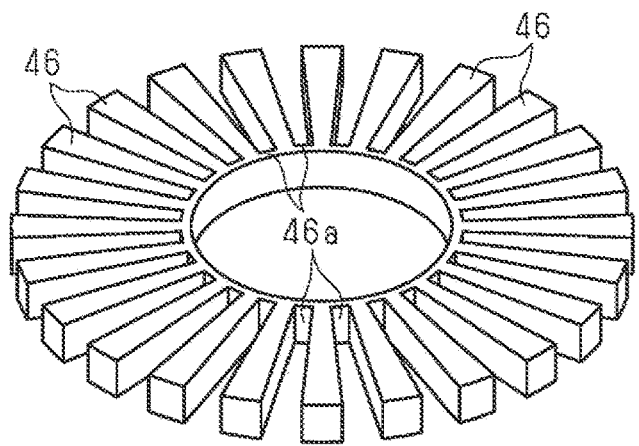
(b)
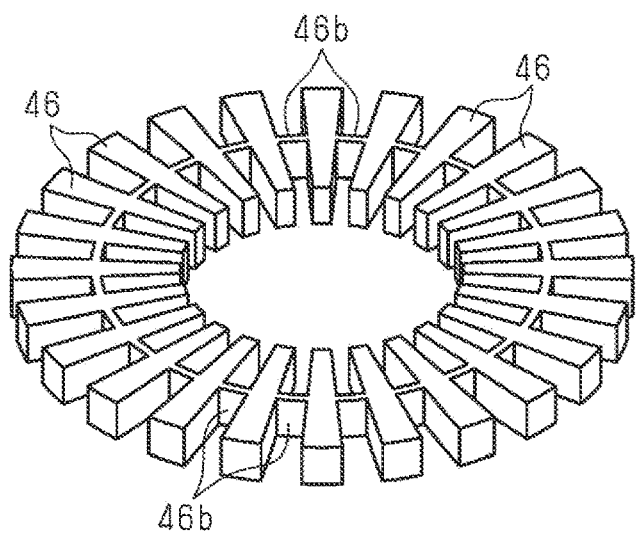
(c)
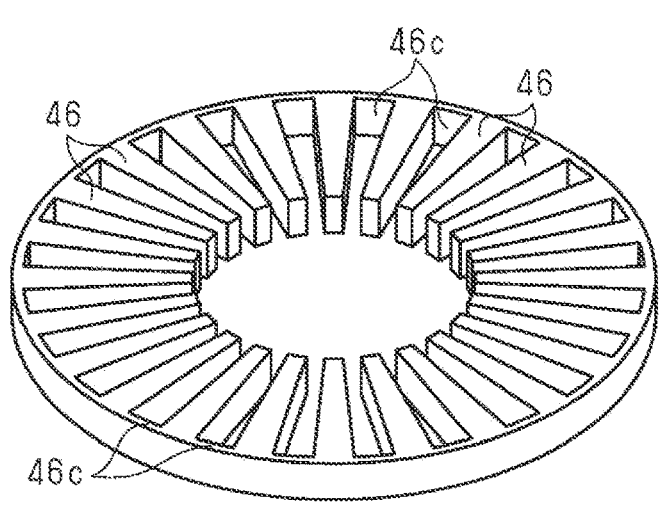

FIG. 20
(a)
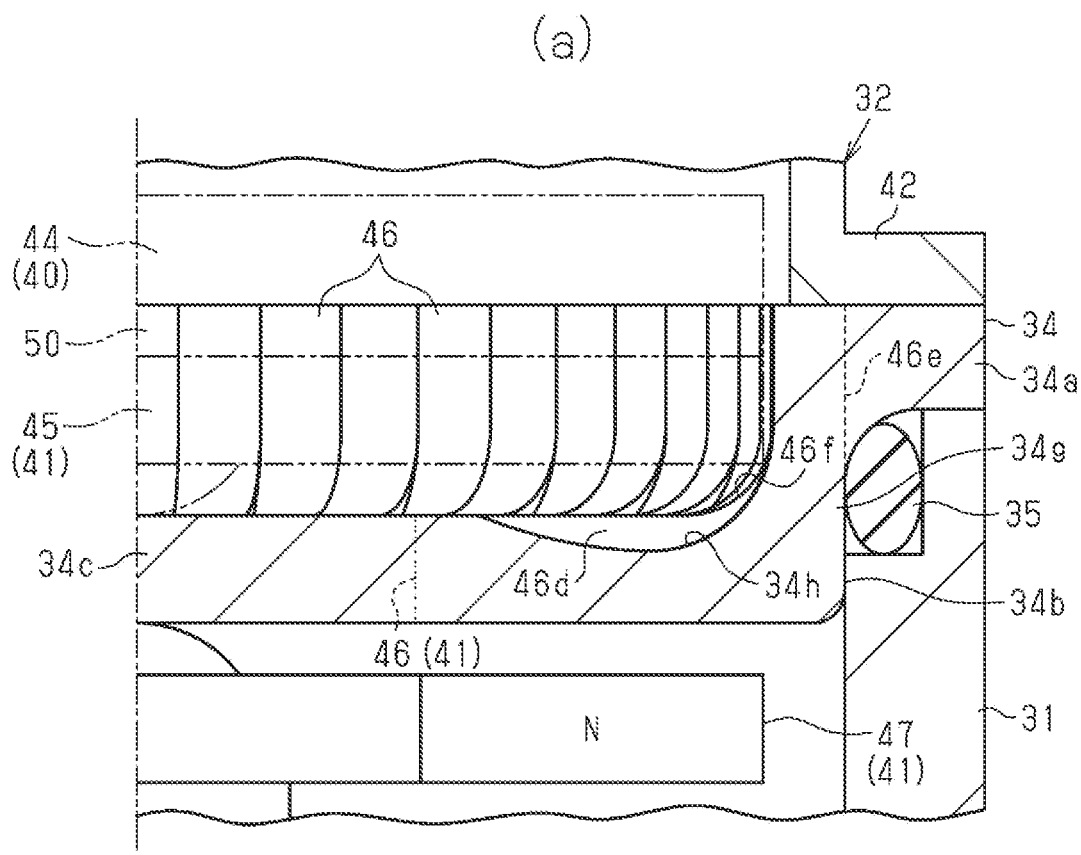
(b)
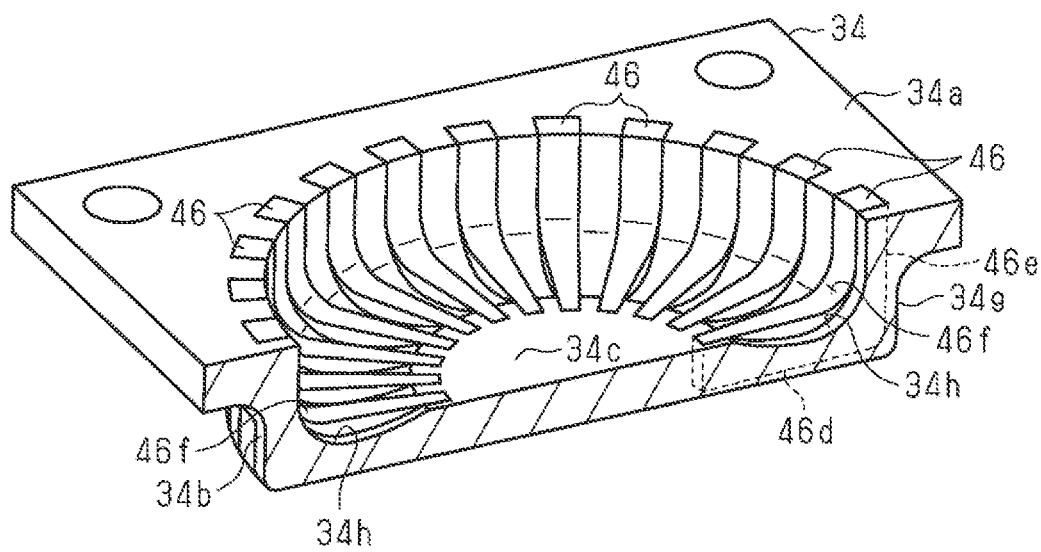

FIG. 21
(a)
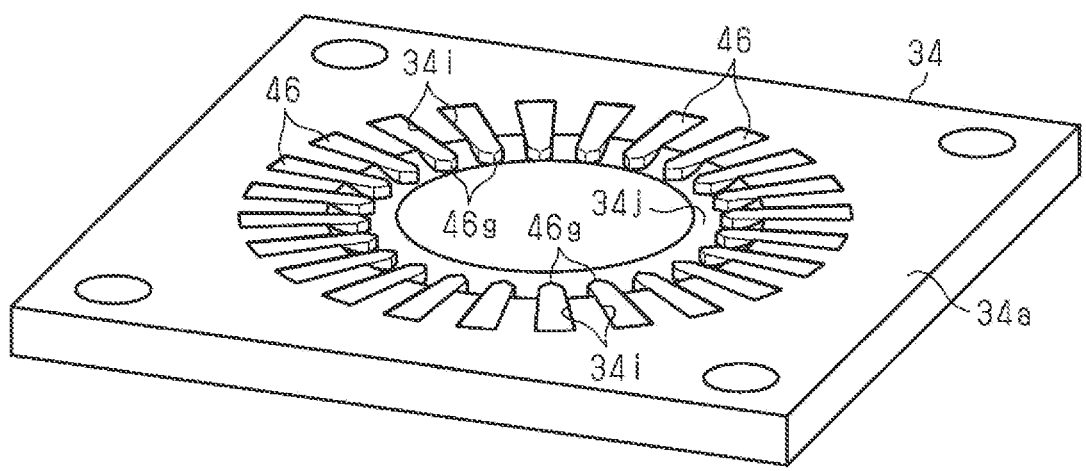
(b)
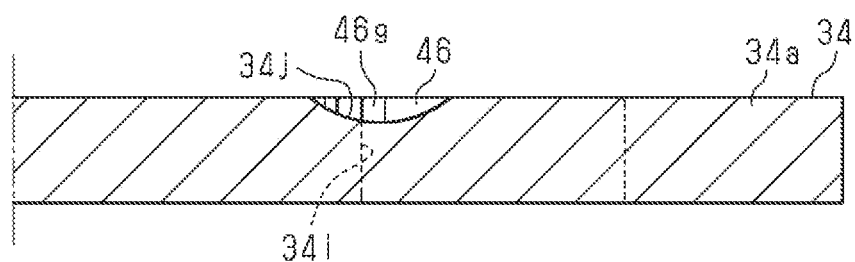

FIG. 22
(a)
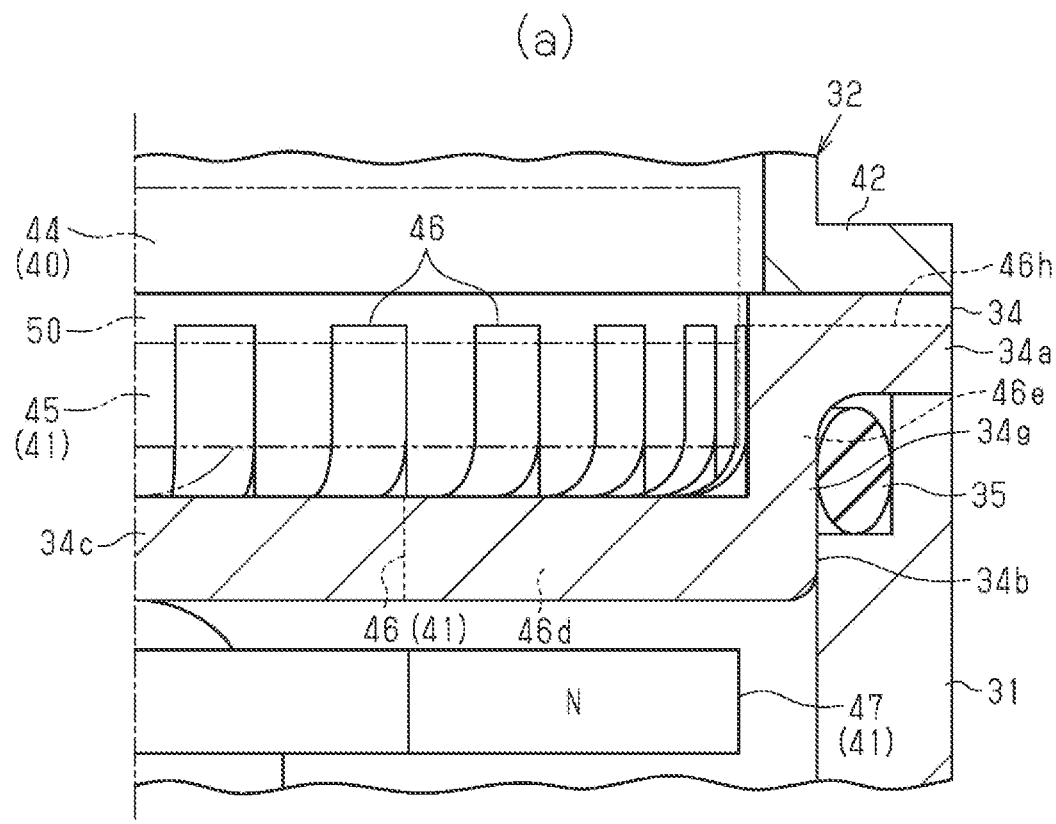
(b)
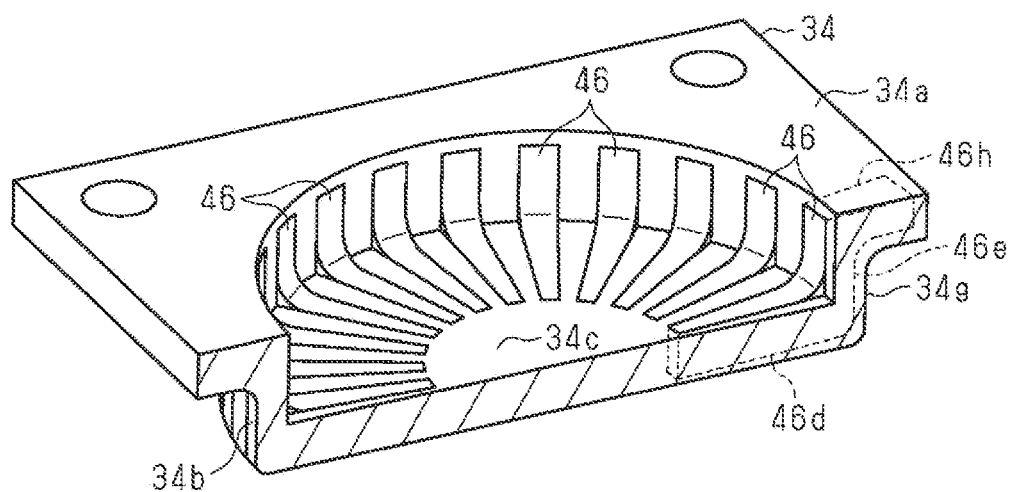

FIG. 23
(a)
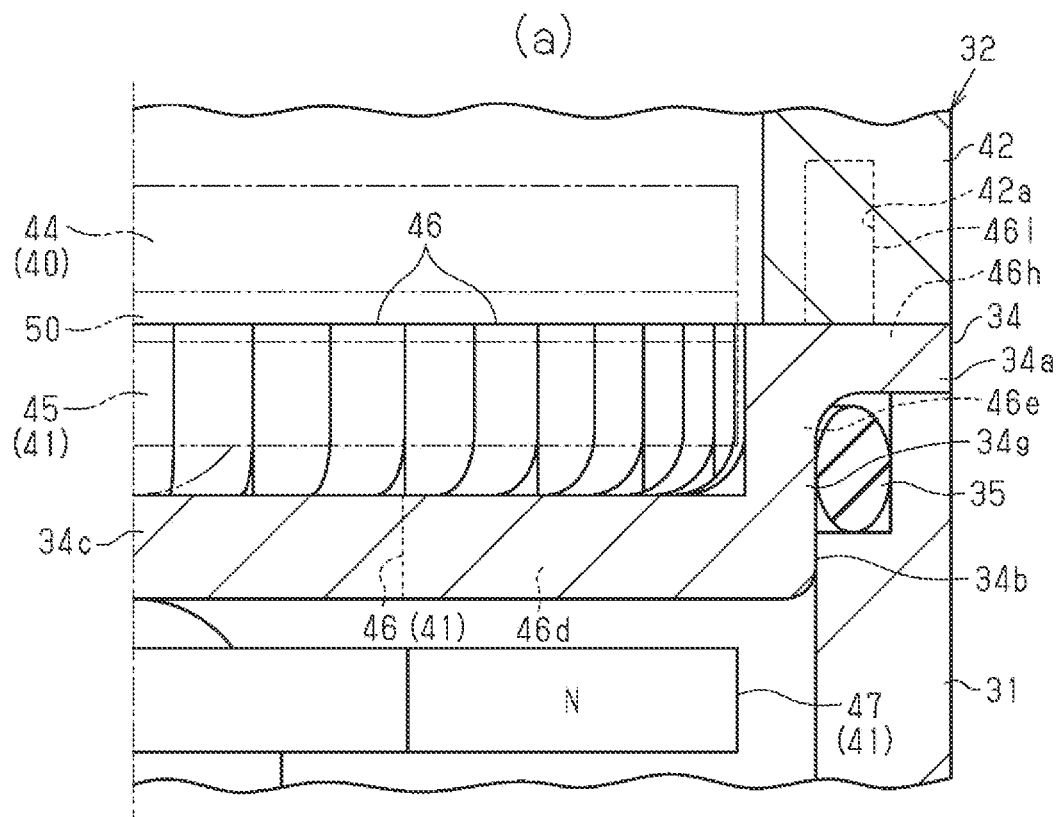
(b)
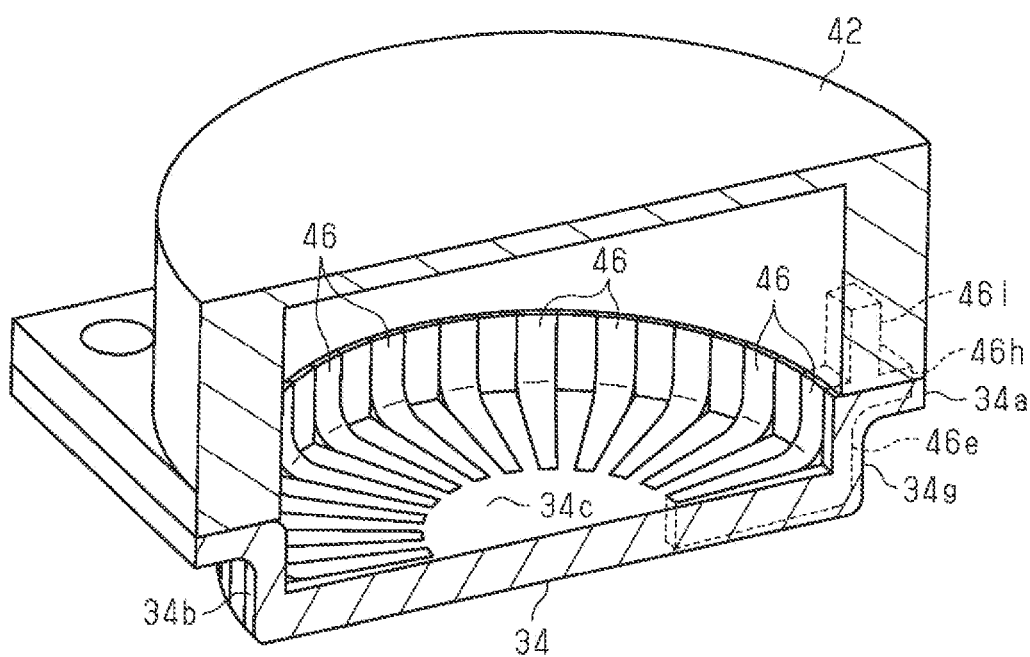

DRIVE DEVICE HAVING DRIVE TRANSMISSION DEVICE

CROSS REFERENCE TO RELATED APPLICATIONS

This application is a continuation application of International Patent Application No. PCT/JP2020/044545 filed on Nov. 30, 2020, which designated the U.S. and claims the benefit of priority from Japanese Patent Application No. 2019-221191 filed on Dec. 6, 2019 and Japanese Patent Application No. 2020-141639 filed on Aug. 25, 2020. The entire disclosures of all of the above applications are incorporated herein by reference.

TECHNICAL FIELD

The present disclosure relates to a drive device having a drive transmission device.

BACKGROUND

Previously, there has been proposed a magnetic coupler, which is capable of contactless drive transmission, as a drive transmission device that performs the drive transmission through a partition wall member. In the magnetic coupler, a drive-side rotatable body and a driven-side rotatable body, which are respectively placed on two opposite sides of the partition wall member, are magnetically coupled. When the driven-side rotatable body is rotated in response to rotation of the drive-side rotatable body, a rotational drive force is transmitted to a driven object through the driven-side rotatable body.

SUMMARY

This section provides a general summary of the disclosure, and is not a comprehensive disclosure of its full scope or all of its features.

According to the present disclosure, there is provided a drive device including an electric motor and a drive force transmission device. The drive transmission device includes a drive-side rotatable body, a plurality of magnetic conducting portions and a driven-side rotatable body. The drive-side rotatable body has a plurality of magnetic poles arranged in a rotational direction of the drive-side rotatable body. The plurality of magnetic conducting portions are arranged in the rotational direction The plurality of magnetic conducting portions are magnetizable by the plurality of magnetic poles of the drive-side rotatable body. The driven-side rotatable body has a plurality of magnetic poles arranged in the rotational direction. The driven-side rotatable body is configured to be rotated in response to rotation of the plurality of magnetic poles of the drive-side rotatable body through the plurality of magnetic conducting portions.

BRIEF DESCRIPTION OF DRAWINGS

The drawings described herein are for illustrative purposes only of selected embodiments and not all possible implementations, and are not intended to limit the scope of the present disclosure.

FIG. 3 is a structural diagram showing the drive transmission device.

FIG. 5 is a structural diagram showing a sealing plate provided with magnetic conductors in a modification.

FIG. 6 is a structural diagram showing a sealing plate provided with magnetic conductors in another modification.

FIG. 10 is a structural diagram showing a sealing plate provided with magnetic conductors in another modification.

FIG. 11 is a structural diagram showing a sealing plate provided with magnetic conductors in another modification.

FIG. 12 is a structural diagram showing a sealing plate provided with magnetic conductors in another modification.

FIG. 13 is a structural diagram showing magnetic conductors in other modifications.

FIG. 20 is a structural diagram showing a sealing plate provided with magnetic conductors in another modification.

FIG. 21 is a structural diagram showing a sealing plate provided with magnetic conductors in another modification.

FIG. 22 is a structural diagram showing a sealing plate provided with magnetic conductors in another modification.

FIG. 23 is a structural diagram showing a sealing plate provided with magnetic conductors in another modification.

DETAILED DESCRIPTION

Figure 1:
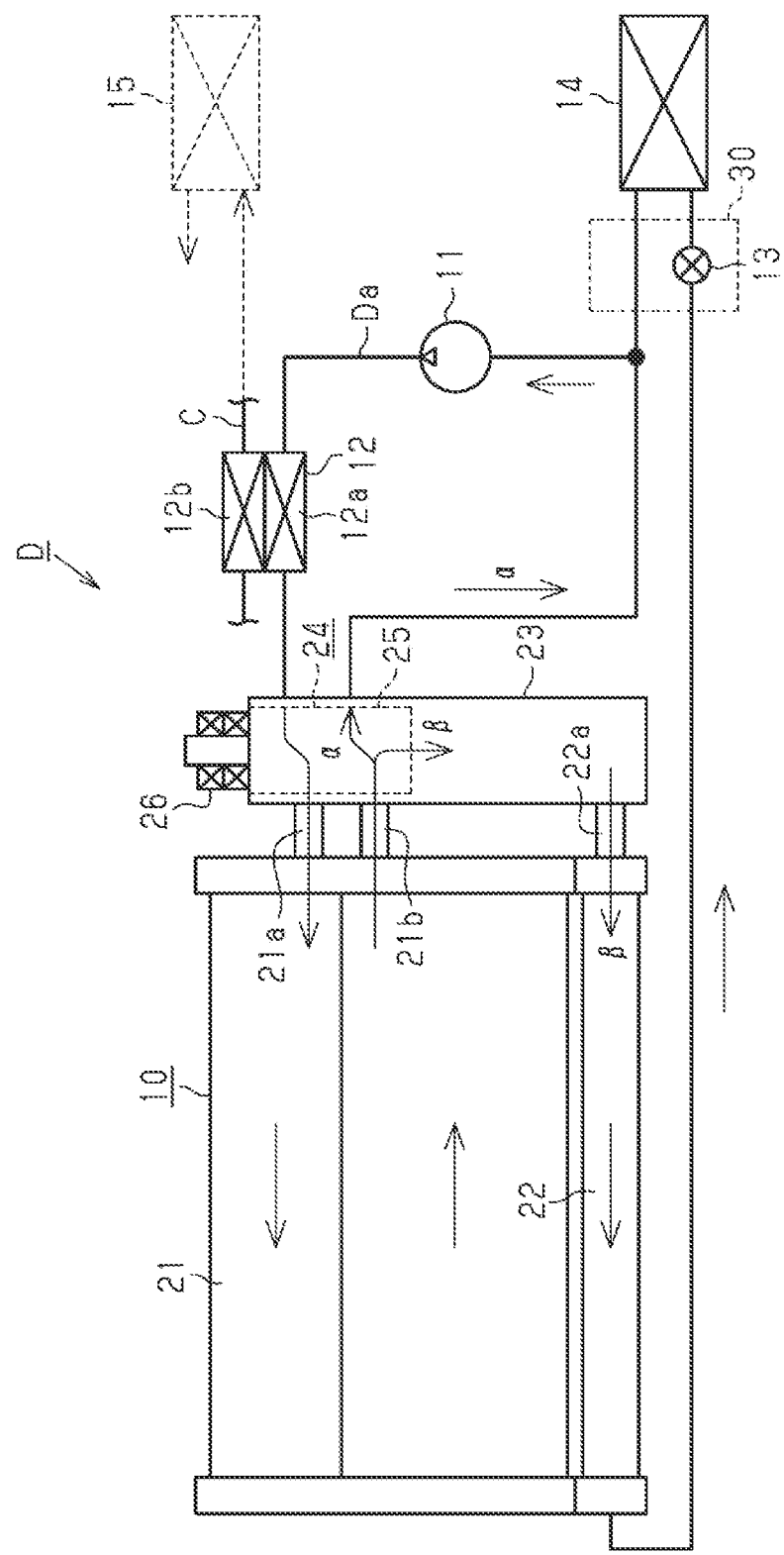
FIG. 1 is a structural diagram showing a refrigeration cycle device including a drive device according to an embodiment.

Previously, there has been proposed a magnetic coupler, which is capable of contactless drive transmission, as a drive transmission device that performs the drive transmission through a partition wall member. In the magnetic coupler, a drive-side rotatable body and a driven-side rotatable body, which are respectively placed on two opposite sides of the partition wall member, are magnetically coupled. When the driven-side rotatable body is rotated in response to rotation of the drive-side rotatable body, a rotational drive force is transmitted to a driven object through the driven-side rotatable body.

Furthermore, in a case where a speed of the rotation, which is transmitted to the driven object, needs to be reduced, there has been proposed a drive transmission device that includes a gear speed reducer, which is provided on a downstream side of the driven-side rotatable body in a drive transmission path to reduce the speed of the rotation received from the driven-side rotatable body.

The inventors of the present application have studied improvements in performances, such as transmission efficiency, quietness, and durability, of the drive transmission device configured to operate as, for example, the magnetic coupler and the speed reducer, and also have studied commonization of the components of the drive transmission device.

According to a first aspect of the present disclosure, there is provided a drive transmission device that is configured to transmit a rotational drive force from a drive side to a driven side and is configured to operate as both:

a magnetic coupler, which is configured to implement contactless magnetic coupling between a drive-side rotatable body and a driven-side rotatable body through a partition wall member; and a speed changer, which is configured to change a speed of rotation to be transmitted to a driven object, the drive transmission device including:

the drive-side rotatable body that has a plurality of magnetic poles arranged in a rotational direction of the drive-side rotatable body;

a plurality of magnetic conducting portions that are arranged in the rotational direction and are magnetically separated from each other, wherein the plurality of magnetic conducting portions are magnetizable by the plurality of magnetic poles of the drive-side rotatable body; and the driven-side rotatable body that has a plurality of magnetic poles arranged in the rotational direction, wherein the driven-side rotatable body is configured to be rotated in response to rotation of the plurality of magnetic poles of the drive-side rotatable body through the plurality of magnetic conducting portions, wherein:

a number of the plurality of magnetic poles of the drive-side rotatable body, a number of the plurality of magnetic conducting portions and a number of the plurality of magnetic poles of the driven-side rotatable body are set to be different from each other, and thereby the drive transmission device is also configured to operate as a magnetic speed changer that is configured to change the speed of the rotation between the drive-side rotatable body and the driven-side rotatable body; and the plurality of magnetic conducting portions are integrated in the partition wall member.

According to a second aspect of the present disclosure, there is provided a drive device including:

an electric motor that is configured to be rotated;

a drive transmission device that is configured to transmit a rotational drive force from the electric motor serving as a drive side to a driven side and is configured to operate as both:

a magnetic coupler, which is configured to implement contactless magnetic coupling between a drive-side rotatable body and a driven-side rotatable body through a partition wall member; and a speed changer, which is configured to change a speed of rotation to be transmitted to a driven object, wherein the drive transmission device includes:

the drive-side rotatable body that has a plurality of magnetic poles arranged in a rotational direction of the drive-side rotatable body;

a plurality of magnetic conducting portions that are arranged in the rotational direction and are magnetically separated from each other, wherein the plurality of magnetic conducting portions are magnetizable by the plurality of magnetic poles of the drive-side rotatable body; and the driven-side rotatable body that has a plurality of magnetic poles arranged in the rotational direction, wherein the driven-side rotatable body is configured to be rotated in response to rotation of the plurality of magnetic poles of the drive-side rotatable body through the plurality of magnetic conducting portions, wherein:

a number of the plurality of magnetic poles of the drive-side rotatable body, a number of the plurality of magnetic conducting portions and a number of the plurality of magnetic poles of the driven-side rotatable body are set to be different from each other, and thereby the drive transmission device is also configured to operate as a magnetic speed changer that is configured to change the speed of the rotation between the drive-side rotatable body and the driven-side rotatable body; and the plurality of magnetic conducting portions are integrated in the partition wall member.

According to each of the above aspects, the drive transmission device is configured to operate as both: the magnetic coupler, which is configured to implement the magnetic coupling between the drive-side rotatable body and the driven-side rotatable body through the plurality of magnetic conducting portions to transmit the rotation therebetween; and the magnetic speed reducer, which is configured to reduce the speed of the rotation at the time of transmitting the rotation from the drive-side rotatable body to the driven-side rotatable body through the plurality of magnetic conducting portions. The drive transmission device implements the function of the magnetic coupler and the function of the magnetic speed reducer by using the common components that include the drive-side rotatable body, the driven-side rotatable body and the plurality of magnetic conducting portions. Furthermore, since the magnetic speed changer is the contactless type, it is highly quiet and has a long life. Also, since the plurality of magnetic conducting portions are integrated in the partition wall member, which is interposed between the drive-side rotatable body and the driven-side rotatable body, the magnetic coupling between the drive-side rotatable body and the driven-side rotatable body can be efficiently implemented, and high transmission efficiency can be expected.

Hereinafter, an embodiment of a drive transmission device and a drive device will be described with reference to the drawings. In the drawings, for convenience of explanation, a part(s) of the structure may be exaggerated or simplified. In addition, a dimensional ratio of each part may differ from the actual one.

As shown in FIG. 1, a heat exchanger 10 of the present embodiment is used in a refrigeration cycle device D for an air conditioning apparatus of an electric vehicle such as a hybrid vehicle or an EV vehicle. The refrigeration cycle device D is a heat pump cycle device. The vehicle air conditioning apparatus, which includes the refrigeration cycle device D, is configured to switch its operation between a cooling mode, in which the air cooled by an evaporator 14 is blown into a vehicle cabin, and a heating mode, in which the air warmed by a heater core 15 is blown into the vehicle cabin. Specifically, a refrigerant circulation circuit Da of the refrigeration cycle device D is configured to be switched between a cooling circulation path 13, which is a circulation circuit corresponding to the cooling mode, and a heating circulation path a, which is a circulation circuit corresponding to the heating mode. As the refrigerant conducted through the refrigerant circulation circuit Da of the refrigeration cycle device D, for example, an HFC-based refrigerant or an HFO-based refrigerant may be used. Furthermore, it is desirable that the refrigerant contains oil for lubricating a compressor 11.

The refrigeration cycle device D includes the compressor 11, a water-cooled condenser 12, the heat exchanger 10, an expansion valve 13 and the evaporator 14 which are arranged in the refrigerant circulation circuit Da.

The compressor 11 is an electric compressor, which is installed in an engine room at an outside of the vehicle cabin. The compressor 11 suctions and compresses the gas phase refrigerant and discharges the gas phase refrigerant, which has the high temperature and the high pressure upon the compression, toward the water-cooled condenser 12. The gas phase refrigerant, which has the high temperature and the high pressure and is discharged from the compressor 11, flows into the water-cooled condenser 12. As a compression mechanism of the compressor 11, various compression mechanisms, such as a scroll type compression mechanism and a vane type compression mechanism, may be used. Furthermore, the compressor 11 is controlled to change a refrigerant discharge capacity.

The water-cooled condenser 12 is a known heat exchanger and includes a first heat exchange unit 12a, which is installed in the refrigerant circulation circuit Da, and a second heat exchange unit 12b, which is installed in a water circulation circuit C of a cooling water circulation device. The heater core 15 is installed in the circulation circuit C. The water-cooled condenser 12 exchanges heat between the gas phase refrigerant, which flows in the first heat exchange unit 12a, and the cooling water, which flows in the second heat exchange unit 12b. Specifically, in the water-cooled condenser 12, the cooling water in the second heat exchange unit 12b is heated by the heat of the gas phase refrigerant in the first heat exchange unit 12a, and the gas phase refrigerant in the first heat exchange unit 12a is cooled. Therefore, the water-cooled condenser 12 serves as a radiator that releases the heat of the refrigerant, which is discharged from the compressor 11 and supplied to the first heat exchange unit 12a, to the blown air of the vehicle air conditioning apparatus through the cooling water and the heater core 15.

The gas phase refrigerant, which has passed through the first heat exchange unit 12a of the water-cooled condenser 12, is supplied to the heat exchanger 10 through an integrated valve device 24 described later. The heat exchanger 10 is an outdoor heat exchanger, which is located at a vehicle front side in the engine room at the outside of the vehicle cabin. The heat exchanger 10 exchanges heat between the refrigerant, which flows in the heat exchanger 10, and the outside air.

The heat exchanger 10 includes a first heat exchange unit 21 and a second heat exchange unit 22 while the second heat exchange unit 22 serves as a supercooling device. Furthermore, a liquid storage device 23 and the integrated valve device 24 are integrated in the heat exchanger 10. The liquid storage device 23 is connected to the first and second heat exchange units 21, 22, and the integrated valve device 24 is installed in the liquid storage device 23. An inflow passage 21a and an outflow passage 21b of the first heat exchange unit 21 are communicated with the integrated valve device 24. An inflow passage 22a of the second heat exchange unit 22 is communicated with the liquid storage device 23 and the integrated valve device 24.

The first heat exchange unit 21 serves as a condenser or an evaporator depending on the temperature of the refrigerant which flows in an inside of the first heat exchange unit 21. The liquid storage device 23 separates the refrigerant into the gas phase refrigerant and the liquid phase refrigerant and stores the separated liquid phase refrigerant in the liquid storage device 23. The second heat exchange unit 22 exchanges the heat between the liquid phase refrigerant, which is received from the liquid storage device 23, and the outside air to further cool the liquid phase refrigerant and thereby to increase a degree of superheat of the refrigerant. The second heat exchange unit 22 supplies the refrigerant to the expansion valve 13 after the heat exchange in the second heat exchange unit 22. The first heat exchange unit 21, the second heat exchange unit 22 and the liquid storage device 23 are connected together by, for example, bolts and are thereby integrated together.

The integrated valve device 24 is an electric valve device and includes a valve main body 25, which is installed in the liquid storage device 23, and an electric motor 26, which drives the valve main body 25. An example of the electric motor 26 is a stepping motor. At the heating mode, the integrated valve device 24 communicates between the first heat exchange unit 12a of the water-cooled condenser 12 and the inflow passage 21a of the first heat exchange unit 21 and also establishes the heating circulation path a that directly communicates the outflow passage 21b of the first heat exchange unit 21 to the compressor 11. Furthermore, at the cooling mode, the integrated valve device 24 communicates between the first heat exchange unit 12a of the water-cooled condenser 12 and the inflow passage 21a of the first heat exchange unit 21 and establishes the cooling circulation path 13 which communicates the outflow passage 21b of the first heat exchange unit 21 to the compressor 11 through the second heat exchange unit 22, the expansion valve 13 and the evaporator 14. At the time of stopping the operation, the integrated valve device 24 places all of the flow passages in a closed state. Specifically, the integrated valve device 24 drives the valve main body 25 by operating the electric motor 26 to shift the operation among operations that respectively correspond to the stop, the heating mode and the cooling mode.

The expansion valve 13 is a valve that decompresses and expands the liquid phase refrigerant supplied from the heat exchanger 10. The expansion valve 13 is integrally formed as an electric expansion valve device 30 that can be operated by an electric motor 40 described later. An example of the electric motor 40 is a brushless motor. The expansion valve 13 reduces the pressure of the liquid phase refrigerant under the low temperature and high pressure state and supplies it to the evaporator 14.

The evaporator 14 is a cooling heat exchanger that serves as an evaporating device which cools the blown air at the cooling mode. The liquid phase refrigerant, which is supplied from the expansion valve 13 to the evaporator 14, exchanges the heat with the air around the evaporator 14 in a duct of the vehicle air conditioning apparatus. By this heat exchange, the liquid phase refrigerant is evaporated, and the air around the evaporator 14 is cooled. Thereafter, the refrigerant in the evaporator 14 flows out toward the compressor 11 and is compressed again by the compressor 11.

Figure 2:
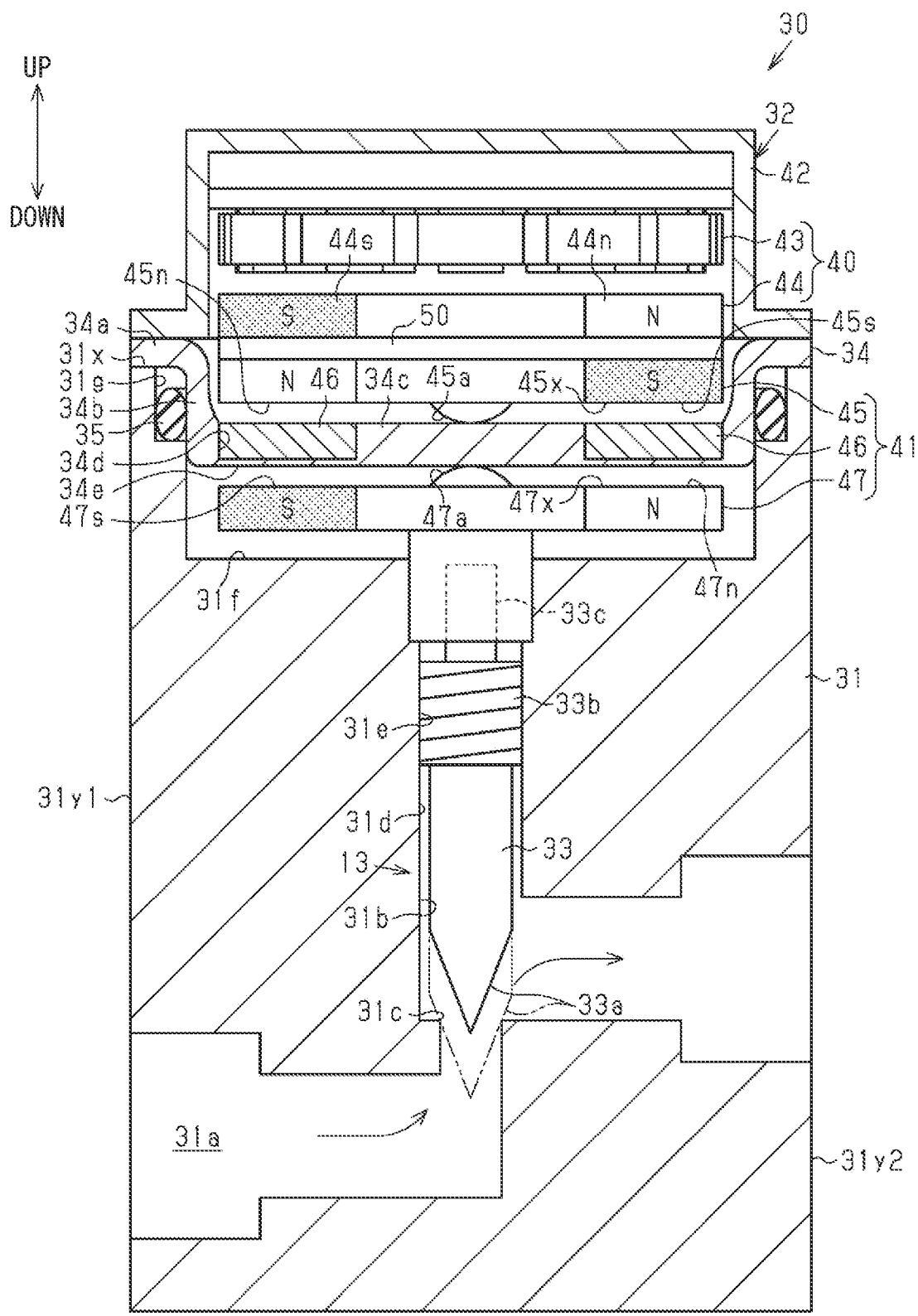
FIG. 2 is a structural diagram showing the drive device including a drive transmission device.

As shown in FIG. 2, the expansion valve device 30 includes: the expansion valve 13, which is installed in an inside of a base block (serving as a fixation-subject member) 31; and a drive device 32, which is integrally fixed to the base block 31 and drives the expansion valve 13.

An inflow passage 31a, which conducts the refrigerant from the second heat exchange unit 22 to the evaporator 14, is formed in the base block 31 of the expansion valve device 30. A cross-sectional area of the inflow passage 31a is shaped in a circle. Here, the base block 31 has a substantially rectangular parallelepiped shape. In a case where one surface of the base block 31, on which the drive device 32 is fixed, is defined as an upper surface 31x (hereinafter, a side, at which the base block 31 is placed, will be described as a lower side, and another side, at which the drive device 32 is placed, will be described as an upper side), the inflow passage 31a extends through the base block 31 from a side surface 31y1, which is located on one side, toward a side surface 31y2, which is located on an opposite side.

In the middle of the inflow passage 31a of the base block 31, a vertical passage 31b, which extends in an up-to-down direction that is perpendicular to the extending direction of the inflow passage 31a, is formed, and a valve element (serving as a driven object) 33 is received in a valve receiving hole 31d which has a circular cross section and is communicated with an upper portion of the vertical passage 31b. The valve element 33 is a needle-shaped valve element having a pointed distal end portion 33a that is directed downward. Specifically, the expansion valve 13, which is a needle valve, is formed such that when the valve element 33 is moved forward or backward in an axial direction (the up-to-down direction in FIG. 2) of the valve element 33, the distal end portion 33a of the valve element 33 opens or closes an opening 31c of the vertical passage 31b to enable or block the flow of the refrigerant in the inflow passage 31a and also adjusts a flow rate of the refrigerant.

Besides the distal end portion 33a described above, the valve element 33 has a male threaded portion 33b and a connecting portion 33c. The male threaded portion 33b is formed at a middle portion of the valve element 33, and the connecting portion 33c is formed at a base end portion of the valve element 33 to connect with a driven-side rotatable body 47 of a drive transmission device 41 described later. The male threaded portion 33b is threadably engaged with a female threaded portion 31e, which is formed at an inner peripheral surface of the valve receiving hole 31d, to convert rotation of the valve element 33 into linear movement of the valve element 33 in the axial direction, i.e., the up-to-down direction. The connecting portion 33c is connected to the driven-side rotatable body 47 such that the connecting portion 33c transmits the rotation, which is received from the driven-side rotatable body 47, to the valve element 33 while permitting the linear movement of the valve element 33. The linear movement of the valve element 33 is an opening/closing movement of the expansion valve 13. The driven-side rotatable body 47 is received in a rotatable body receiving recess 31f that is communicated with an upper end of the valve receiving hole 31d.

A sealing plate (serving as a partition wall member) 34 is fixed to the upper surface 31x of the base block 31 by fixing screws (not shown). The sealing plate 34 closes and thereby seals the opening 31g of the rotatable body receiving recess 31f in a state where the driven-side rotatable body 47 is received in the rotatable body receiving recess 31f. The sealing plate 34 is formed by, for example, processing a plate material made of a non-magnetic metal material (e.g., a non-magnetic SUS material) through press working or by processing a plate-shaped block material made of the non-magnetic metal material (e.g., the non-magnetic SUS material) through a cutting process. The sealing plate 34 has a recessed segment 34b, which is shaped generally in a circular form and is formed by recessing a center portion of a peripheral plate portion 34a placed on the upper surface 31x of the base block 31. When the recessed segment 34b of the sealing plate 34 is seen from an opposite side, which is opposite from an opening of a recess of the recessed segment 34b, the recessed segment 34b is formed as a bulged portion. The opening 31g and the rotatable body receiving recess 31f of the base block 31 are respectively shaped in a circular form, and the recessed segment 34b of the sealing plate 34 is inserted into the rotatable body receiving recess 31f through the opening 31g. A drive-side rotatable body 45 of the drive transmission device 41 is received in an inside of the recessed segment 34b of the sealing plate 34. Specifically, since the position of the drive-side rotatable body 45 is closer to the base block 31, the amount of projection of the drive device 32, which includes the drive-side rotatable body 45, is advantageously minimized.

Furthermore, a partition surface portion 34c of the sealing plate 34, which is shaped in a circular form and is a bottom surface portion of the recessed segment 34b, is interposed between the drive-side rotatable body 45 and the driven-side rotatable body 47 to serves as a partition wall that partitions between the drive device 32, at which the drive-side rotatable body 45 is provided, and the base block 31, at which the driven-side rotatable body 47 is provided. The sealing plate 34 limits intrusion of the refrigerant, which is handled at the base block 31, into the drive device 32. Furthermore, a seal member 35, which is shaped in an annular form, tightly contacts an outer peripheral surface of the recessed segment 34b of the sealing plate 34 and also tightly contacts the opening 31g of the base block 31. The opening 31g of the base block 31 is more reliably placed in the sealed state by using the seal member 35.

Furthermore, a plurality of magnetic conductors (serving as a plurality of magnetic conducting portions) 46, which form a portion of the drive transmission device 41, are integrally assembled to the partition surface portion 34c at the recessed segment 34b of the sealing plate 34. The magnetic conductors 46 are made from, for example, a magnetic metal plate material or magnetic metal powder. Each of the magnetic conductors 46 has a fan shape in a view taken in the axial direction and has a rectangular shape in a view taken in a direction perpendicular to the axis. The magnetic conductors 46 are arranged at equal intervals in the circumferential direction (see (b) of FIG. 3). In this case, a plurality of installation recesses (serving as a plurality of recesses) 34d are formed at the partition surface portion 34c of the sealing plate 34 such that the number of the installation recesses 34d, the shape of the respective installation recesses 34d and the locations of the installation recesses 34d are the same as those of the magnetic conductors 46. Furthermore, each of the installation recesses 34d opens at a location that is on the drive-side rotatable body 45 side, and each of the installation recesses 34d is closed by a corresponding one of thin wall portions 34e at a location that is on the driven-side rotatable body 47 side.

The magnetic conductors 46 are manufactured in advance separately from the sealing plate 34 and are respectively fitted and assembled into the installation recesses 34d. When the magnetic conductors 46 are respectively fitted into the installation recesses 34d, an upper surface of each of the magnetic conductors 46 is flush with an upper surface of the partition surface portion 34c. The magnetic conductors 46 are respectively fixed to the installation recesses 34d by, for example, press-fitting, welding or bonding. By assembling the magnetic conductors 46 in this way, the partition surface portion 34c of the sealing plate 34 is formed such that a plurality of magnetic portions, in which the magnetic conductors 46 are respectively provided, and a plurality of non-magnetic portions, in which the magnetic conductors 46 are absent, are alternately arranged in the circumferential direction.

The drive device 32 includes: the electric motor 40, which is, for example, the brushless motor; and the drive transmission device 41, which transmits a drive force of the electric motor 40 to the valve element 33 in the base block 31 through the sealing plate 34. In the drive device 32, a housing (serving as a fixation-subject member) 42, which has a receiving space at an inside thereof, is fixed to the upper surface 31x of the base block 31 by, for example, mounting screws (not shown). A stator 43 of the electric motor 40 is fixed to an inner peripheral surface of the housing 42, and a rotor 44 of the electric motor 40 is rotatably placed on a lower side of the stator 43. A rotatable shaft (not shown) of the rotor 44 is supported by the stator 43 or the housing 42 through a bearing (not shown).

The rotor 44 includes a plurality of magnetic poles which include a plurality of N magnetic poles 44n and a plurality of S magnetic poles 44s. Furthermore, the rotor 44 is formed integrally with the drive-side rotatable body 45 of the drive transmission device 41. A magnetic plate 50 is interposed between the rotor 44 and the drive-side rotatable body 45.

The drive transmission device 41 includes: the drive-side rotatable body 45, which is integrated at a lower surface side of the rotor 44; the magnetic conductors 46, which are integrally assembled to the sealing plate 34; and the driven-side rotatable body 47, which is placed on an opposite side of the sealing plate 34 that is opposite to the drive-side rotatable body 45. The electric motor 40, which includes the rotor 44; the drive-side rotatable body 45; the magnetic conductors 46 arranged in a circular ring form; and the driven-side rotatable body 47 are arranged along an axis of the valve element 33 of the expansion valve 13.

The drive transmission device 41 is configured to operate as a magnetic coupler and a magnetic speed reducer through use of the drive-side rotatable body 45, the magnetic conductors 46 and the driven-side rotatable body 47.

As shown in (a) to (c) of FIG. 3, the drive-side rotatable body 45 includes a plurality of magnetic poles, which include an N magnetic pole 45n and an S magnetic pole 45s (the number of magnetic poles is two, and the number of magnetic pole pair is one) and are arranged at equal intervals, i.e., 180 degree intervals in an outer peripheral ring region of an opposing magnetic surface 45x which is a lower surface of the drive-side rotatable body 45. The drive-side rotatable body 45 has an axial receiving portion 45a, which is shaped in a convex hemispherical form and is located at a center of the lower surface of the drive-side rotatable body 45 to contact the partition surface portion 34c of the sealing plate 34. The rest of the drive-side rotatable body 45, which is other than the axial receiving portion 45a, is spaced from the partition surface portion 34c of the sealing plate 34 by a predetermined gap.

The partition surface portion 34c of the sealing plate 34, which has the magnetic conductors 46, is opposed to the lower surface of the drive-side rotatable body 45 in the axial direction. The number of the magnetic conductors 46 is six, and these six magnetic conductors 46 are placed in an outer peripheral ring region of the partition surface portion 34c of the sealing plate 34 which is opposed to the magnetic poles 45n, 45s of the drive-side rotatable body 45 in the axial direction. The magnetic conductors 46 are arranged at equal intervals in the circumferential direction such that the magnetic conductors 46 are spaced from each other and are magnetically separated from each other. In this case, each of the magnetic conductors 46 is shaped in a circular sector that has an angular extent of 30 degrees, and each adjacent two of the magnetic conductors 46 are spaced from each other by 30 degrees. Specifically, at the partition surface portion 34c of the sealing plate 34, which has the magnetic conductors 46, the magnetic portions, in which the magnetic conductors 46 are respectively provided, and the non-magnetic portions, in which the magnetic conductors 46 are absent, are alternately arranged by 30 degree intervals in the circumferential direction.

The driven-side rotatable body 47 is opposed to a lower surface of the partition surface portion 34c, which has the magnetic conductors 46, in the axial direction. The driven-side rotatable body 47 includes a plurality of magnetic poles, which include five N magnetic poles 47n and five S magnetic poles 47s (the number of magnetic poles is ten, and the number of magnetic pole pair is five). The N magnetic poles 47n and the S magnetic poles 47s are alternately arranged at equal intervals, i.e., 36 degree intervals in an outer peripheral ring region of an opposing magnetic surface 47x which is an upper surface of the driven-side rotatable body 47 opposed to the magnetic conductors 46 in the axial direction. The driven-side rotatable body 47 has an axial receiving portion 47a, which is shaped in a convex hemispherical form and is located at a center of the upper surface of the driven-side rotatable body 47 to contact the partition surface portion 34c of the sealing plate 34. The rest of the driven-side rotatable body 47, which is other than the axial receiving portion 47a, is spaced from the partition surface portion 34c of the sealing plate 34 by a predetermined gap. The driven-side rotatable body 47 is received in the rotatable body receiving recess 31f of the base block 31, which is adjacent to the lower surface of the sealing plate 34.

Figure 4:
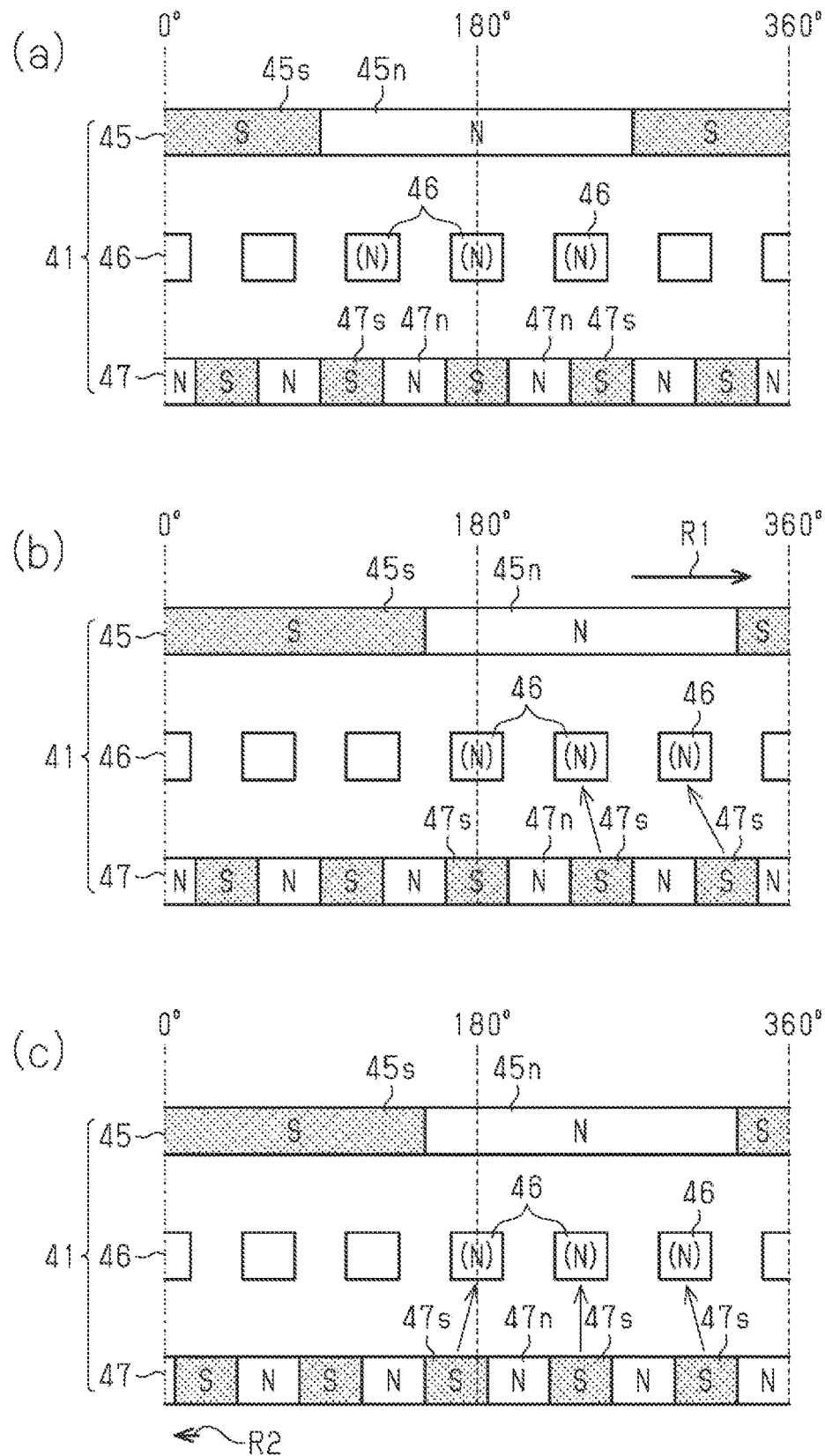
FIG. 4 is an operation descriptive diagram showing the drive transmission device.

The drive transmission device 41, which has the above-described structure, is operated in a manner shown in (a)-(c) of FIG. 4. The following description focuses on the N magnetic pole 45n of the drive-side rotatable body 45. According to the structure of the drive-side rotatable body 45, the structure of the sealing plate 34 having the magnetic conductors 46 and the structure of the driven-side rotatable body 47 of the present embodiment, the N magnetic pole 45n, which has the angular range of 180 degrees in the drive-side rotatable body 45, corresponds to an angular range that includes three of the magnetic portions, which respectively have the three magnetic conductors 46, and three of the non-magnetic portions, each of which is interposed between adjacent two of the magnetic portions, at the sealing plate 34 having the magnetic conductors 46. Furthermore, the N magnetic pole 45n corresponds to an angular range that includes three of the S magnetic poles 47s and two of the N magnetic poles 47n at the driven-side rotatable body 47.

In a state shown in (a) of FIG. 4, three of the magnetic conductors 46 are opposed to the range of the N magnetic pole 45n of the drive-side rotatable body 45 and are thereby respectively magnetized as the N pole, and the centered magnetic conductor 46, which is circumferentially centered among these three magnetic conductors 46, is placed at a magnetic pole center of the N magnetic pole 45n. Furthermore, three of the S magnetic poles 47s are opposed to the range of the N magnetic pole 45n, and the centered S magnetic pole 47s, which is circumferentially centered among these three S magnetic poles 47s, is opposed to the centered magnetic conductor 46. This is a stable state where a rotational force is not generated at the driven-side rotatable body 47. Then, when the electric motor 40 rotates the drive-side rotatable body 45 (see an arrow R1) by an amount that corresponds to the angular extent of one of the magnetic conductors 46, the state is changed to a state shown in (b) of FIG. 4.

In the state shown in (b) of FIG. 4, another set of three magnetic conductors 46, each of which is shifted by one in the rotational direction, are respectively magnetized to the N pole, and the centered magnetic conductor 46, which is circumferentially centered among these three magnetic conductors 46, is placed at the magnetic pole center of the N magnetic pole 45n at the drive-side rotatable body 45. Then, there is generated a rotational force, which is exerted in a direction opposite to the rotational direction of the drive-side rotatable body 45 that tries to place the centered magnetic conductor 46 in an opposed position where the centered magnetic conductor 46 directly opposes the centered S magnetic pole 47s among the three S magnetic poles 47s that are opposed to the range of the N magnetic pole 45n. In this way, as shown in (c) of FIG. 4, the driven-side rotatable body 47 is rotated (see an arrow R2) by the amount, which is smaller than the amount of rotation of the drive-side rotatable body 45, in the opposite direction, which is opposite to the rotational direction of the drive-side rotatable body 45, in response to the rotation of the drive-side rotatable body 45.

When the drive-side rotatable body 45 continuously rotates, the operation, which is described with the N magnetic pole 45n, also takes place for the S magnetic pole 45s, so that the driven-side rotatable body 47 is rotated by the amount, which is smaller than the amount of rotation of the drive-side rotatable body 45, in the opposite direction, which is opposite to the rotational direction of the drive-side rotatable body 45. Specifically, when the drive-side rotatable body 45 is rotated by 60 degrees, which is the angular extent of each of the magnetic conductors 46, the driven-side rotatable body 47 is rotated by 12 degrees, which is the angular extent of each of the magnetic poles 47n, 47s, in the opposite direction. That is, a rotation ratio (a speed reduction ratio) between the drive-side rotatable body 45 and the driven-side rotatable body 47 is 5:1, and the rotation of the drive-side rotatable body 45 undergoes a speed reduction and a torque increase during a process of transmitting the rotation of the drive-side rotatable body 45 to the driven-side rotatable body 47 through the magnetic conductors 46.

As the magnetic speed reducer, the number of the magnetic pole pair(s) of the drive-side rotatable body 45, the number of the magnetic pole pair(s) of the driven-side rotatable body 47 and the number of the magnetic conductors 46 are set to satisfy the following equation (I).

$$b = c + a \qquad (I)$$

In the above equation (I), "a" denotes the number of the magnetic pole pair(s) of the magnetic poles of the drive-side rotatable body 45, and "b" denotes the number of the magnetic conductors 46, and "c" denotes the number of the magnetic pole pair(s) of the magnetic poles of the driven-side rotatable body 47.

In the drive transmission device 41 of the present embodiment, which is configured to operate as the magnetic speed reducer, the number of the magnetic pole pair(s) of the magnetic poles 45n, 45s of the drive-side rotatable body 45 is one, and the number of the magnetic conductors 46 is six, and the number of the magnetic pole pair(s) of the magnetic poles 47n, 47s of the driven-side rotatable body 47 is five. Therefore, the above equation is satisfied.

Even when the number of the magnetic pole pair(s) of the drive-side rotatable body 45, the number of the magnetic pole pair(s) of the driven-side rotatable body 47 and the number of the magnetic conductors 46 are set to satisfy the following equation (II), the drive transmission device 41 can serve as the magnetic speed reducer.

$$b = c - a \qquad (II)$$

In the present embodiment, which satisfies the above equation (I), there is implemented one aspect where the driven-side rotatable body 47 is rotated in the opposite direction in response to the rotation of the drive-side rotatable body 45 while reducing the rotational speed of the rotation transmitted from the drive-side rotatable body 45 to the driven-side rotatable body 47. In contrast, when the above equation (II) is satisfied, there is implemented another aspect where the driven-side rotatable body 47 is rotated in the same direction as that of the drive-side rotatable body 45 in response to the rotation of the drive-side rotatable body 45 while reducing the rotational speed of the rotation transmitted from the drive-side rotatable body 45 to the driven-side rotatable body 47.

The drive transmission device 41 described above has the structure, which is capable of contactless drive transmission by the magnetic speed reducer, unlike the well-known gear speed reducer that reduces the rotational speed through the gears meshed with each other. Therefore, the drive transmission device 41 is extremely quiet at the time of drive transmission. Furthermore, as the magnetic coupler, the drive transmission device 41 is capable of contactless drive transmission between the drive-side rotatable body 45 and the driven-side rotatable body 47, so that the sealing plate 34 can be interposed between the drive-side rotatable body 45 and the driven-side rotatable body 47 as described in the present embodiment. Specifically, the opening 31g of the base block 31 can be liquid-tightly sealed by the sealing plate 34. That is, the intrusion of the refrigerant, which is present at the inside of the opening 31g of the base block 31, into the inside of the housing 42 of the drive device 32 having the electric motor 40, is limited by the sealing plate 34.

The drive transmission device 41 and the drive device 32 of the present embodiment include not only the electric motor 40 and the drive-side rotatable body 45 located on the upper side of the sealing plate 34 but also include the sealing plate 34 having the magnetic conductors 46 as well as the driven-side rotatable body 47 located on the lower side of the sealing plate 34.

Furthermore, by controlling the rotation of the electric motor 40, the forward/backward position of the valve element 33 of the expansion valve 13 is adjusted through the drive transmission device 41 to adjust the supply amount of the refrigerant to the evaporator 14. That is, by controlling the opening/closing of the expansion valve 13 with the expansion valve device 30 in corporation with the integrated valve device 24 of the vehicle air conditioning apparatus, the air conditioning of the vehicle air conditioning apparatus is controlled.

Next, advantages of the present embodiment will be described.

(1) The drive transmission device 41 is configured to operate as both: the magnetic coupler, which is configured to implement the magnetic coupling between the drive-side rotatable body 45 and the driven-side rotatable body 47 through the magnetic conductors 46 to transmit the rotation therebetween; and the magnetic speed reducer, which is configured to reduce the speed of the rotation at the time of transmitting the rotation from the drive-side rotatable body 45 to the driven-side rotatable body 47 through the magnetic conductors 46. The drive transmission device 41 implements the function of the magnetic coupler and the function of the magnetic speed reducer by using the common components that include the drive-side rotatable body 45, the driven-side rotatable body 47 and the magnetic conductors 46. Furthermore, since the magnetic speed reducer is the contactless type, it is highly quiet and has a long life. Also, since the magnetic conductors 46 are installed to the partition surface portion 34c of the sealing plate 34, which is interposed between the drive-side rotatable body 45 and the driven-side rotatable body 47 and serves as the partition wall member, the magnetic coupling between the drive-side rotatable body 45 and the driven-side rotatable body 47 can be efficiently implemented, and high transmission efficiency can be expected.

(2) The magnetic conductors 46, which are manufactured in advance, are assembled to the installation recesses 34d, respectively, of the partition surface portion 34c of the sealing plate 34, so that positioning of the magnetic conductors 46 can be performed simultaneously with the assembling of the magnetic conductors 46. The assembling of the magnetic conductors 46 can be easily performed while positioning the magnetic conductors 46. Furthermore, a portion of each installation recess 34d, which is opposite to the opening of the installation recess 34d, is closed by the thin wall portion 34e, so that the original sealing function of the sealing plate 34 is not lost. Also, although the thin wall portion 34e is interposed between each magnetic conductor 46 and the driven-side rotatable body 47, since the thickness of the thin wall portion 34e is small, the magnetic coupling between the magnetic conductors 46 and the driven-side rotatable body 47 is not significantly impaired.

(3) The magnetic conductors 46 to be installed in the installation recesses 34d of the partition surface portion 34c of the sealing plate 34 can be easily manufactured from a magnetic metal plate material. Furthermore, each magnetic conductor 46 can be easily formed as a sintered member or a resin member by using magnetic metal powder. When the magnetic metal powder is used, it is possible to reduce eddy current loss.

(4) Since the sealing plate 34 has the recessed segment 34b, the rigidity of the sealing plate 34 is high in terms of its shape. Therefore, unnecessary deformation of the sealing plate 34 can be limited. Furthermore, by installing the annular seal member 35 on the outer peripheral surface of the recessed segment 34b of the sealing plate 34, the seal member 35 closely contacts each of the sealing plate 34 and the base block 31 mainly in the direction perpendicular to the axis. At the sealing plate 34, the partition surface portion 34c receives the pressure in the axial direction from the refrigerant flowing in the base block 31. However, this pressure application direction is perpendicular to the contact direction of the seal member 35, so that the seal member 35 can maintain the close contact even when the refrigerant pressure is applied.

(5) Since the drive-side rotatable body 45, the magnetic conductors 46 and the driven-side rotatable body 47 are opposed to each other in the axial direction, it is possible to contribute to the simplified structure of the drive transmission device 41, and the size of the drive transmission device 41 in the direction perpendicular to the axis and the size of the drive device 32 in the direction perpendicular to the axis can be made small.

The present embodiment can be modified as follows. The present embodiment and any one or more the following modifications can be combined as long as there is no inconsistency for such a combination.

The structure of the drive transmission device 41 of the above embodiment is an example and may be modified as appropriate.

First of all, modifications of the sealing plate 34 having the magnetic conductors 46 will be described. For example, the number of the magnetic conductors 46 is not limited to six described in the above embodiment, and the number of the magnetic conductors 46 may be twenty four as shown in (a)-(b) of FIG. 5. In such a case, the number of the installation recesses 34d of the partition surface portion 34c of the sealing plate 34 need to be also twenty four. In the case where the number of the magnetic conductors 46 is twenty four, according to the above equation for implementing the function of the magnetic speed reducer at the drive transmission device 41, for example, the number of magnetic pole pairs of the magnetic poles 45n, 45s of the drive-side rotatable body 45 is set to four, and the number of magnetic pole pairs of the magnetic poles 47n, 47s of the driven-side rotatable body 47 is twenty. Of course, each of the number of the magnetic conductors 46, the number of magnetic pole pairs of the magnetic poles 45n, 45s of the drive-side rotatable body 45, and the number of magnetic pole pairs of the magnetic poles 47n, 47s of the driven-side rotatable body 47 may be any suitable number other than the above-described number.

Further, the present disclosure is not limited to the above embodiment in which the magnetic conductors 46 are formed in advance and are respectively installed in the installation recesses 34d each having the thin wall portion 34e. For example, as shown in (a)-(b) of FIG. 6, the magnetic conductors 46 may be respectively installed in a plurality of installation holes (serving as a plurality of through-holes) 34f each of which is a through-hole penetrating through the upper surface and the lower surface of the partition surface portion 34c. It is easier to form the installation holes 34f, which are the through-holes, than to form the installation recesses 34d each having the thin wall portion 34e, and the sealing plate 34 can be easily manufactured. Furthermore, the thickness of each magnetic conductor 46 may be increased in the axial direction by the amount that corresponds to the thickness of the eliminated thin wall portion 34e, so that the lower surface of the magnetic conductor 46 is flush with the lower surface of the partition surface portion 34c of the sealing plate 34. In this way, not only the drive-side rotatable body 45 and the magnetic conductors 46 are directly opposed to each other, but also the magnetic conductors 46 and the driven-side rotatable body 47 are directly opposed to each other. Therefore, the magnetic transmission efficiency can be improved between the magnetic conductors 46 and the driven-side rotatable body 47. In this instance, it is preferable that a periphery of each magnetic conductors 46 is liquid-tightly sealed to limit deterioration of the sealing function of the sealing plate 34.

Figure 7:
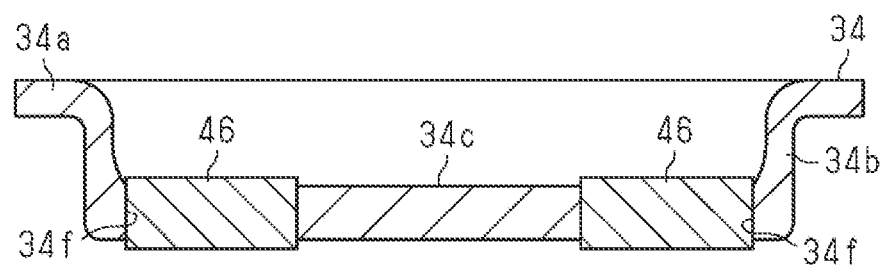
FIG. 7 is a structural diagram showing a sealing plate provided with magnetic conductors in another modification.

Furthermore, as shown in FIG. 7, each magnetic conductor 46, which is installed in the corresponding installation hole 34f, may axially project from each of the upper surface and the lower surface of the partition surface portion 34c of the sealing plate 34. In this way, the driving side rotating body 45 and the magnetic conductors 46 can be positioned further closer to each other to further improve the magnetic transmission efficiency therebetween while implementing the direct opposition between the drive-side rotatable body 45 and the magnetic conductors 46. Also, the magnetic conductors 46 and the driven-side rotatable body 47 can be positioned further closer to each other to further improve the magnetic transmission efficiency therebetween while implementing the direct opposition between the magnetic conductors 46 and the driven-side rotatable body 47. The magnetic conductor 46 may project from only one of the upper surface and the lower surface of the partition surface portion 34c of the sealing plate 34.

Figure 8:
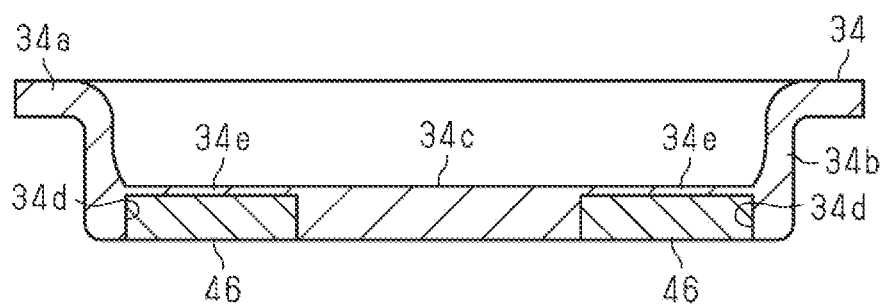
FIG. 8 is a structural diagram showing a sealing plate provided with magnetic conductors in another modification.

Further, the present disclosure is not limited to the above embodiment in which the thin wall portion 34e of each installation recess 34d is placed at the lower surface side of the partition surface portion 34c, at which the driven-side rotatable body 47 is located. For example, as shown in FIG. 8, the thin wall portion 34e of each installation recess 34d may be placed at the upper surface side of the partition surface portion 34c, at which the drive-side rotatable body 45 is located. In this way, the magnetic conductors 46 and the driven-side rotatable body 47 can be positioned further closer to each other to further improve the magnetic transmission efficiency therebetween while implementing the direct opposition between the magnetic conductors 46 and the driven-side rotatable body 47.

Furthermore, the manufacturing method is not limited to the above-described manufacturing method where the magnetic conductors 46, which are formed in advance by using, for example, the magnetic metal plate material or the magnetic metal powder, are installed in the installation recesses 34d or the installation holes 34f. For example, the installation recesses 34d or the installation holes 34f of the partition surface portion 34c of the sealing plate 34 may be used as a die, and sintering powder, which includes the magnetic metal powder, may be compression-molded in the installation recesses 34d or the installation holes 34f, or molten resin material, which includes the magnetic metal powder, may be poured in the installation recesses 34d or the installation holes 34f. The magnetic conductors 46 may be formed directly on the sealing plate 34 as discussed above. In this way, not only the eddy current loss is reduced, but also the magnetic conductors 46 do not need to be assembled. Also, there is no component interference between the assembled members. Additionally, it is possible to fill with the magnetic members without forming a gap between each magnetic conductor 46 and its surrounding.

Figure 9:
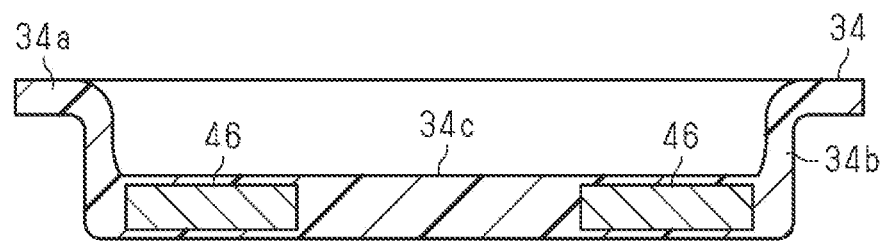
FIG. 9 is a structural diagram showing a sealing plate provided with magnetic conductors in another modification.

Furthermore, the present disclosure is not limited to the above embodiment where the sealing plate 34 is formed through the press working of the non-magnetic metal plate material (e.g., the non-magnetic SUS) or cutting of the block material made of the non-magnetic metal material. For example, as shown in FIG. 9 and (a)-(b) of FIG. 10, the sealing plate 34 may be made of a non-magnetic resin material. The sealing plate 34 may be manufactured by insert molding where a non-magnetic resin material is poured around the magnetic conductors 46 that are formed in advance. FIG. 9 shows an example where the magnetic conductors 46 are entirely embedded in the partition surface portion 34c of the sealing plate 34. In FIG. 10, (a)-(b) show an example where the upper surface of each magnetic conductor 46 is flush with the upper surface of the partition surface portion 34c of the sealing plate 34 and is thereby axially exposed from the partition surface portion 34c, and the lower surface of each magnetic conductor 46 is flush with the lower surface of the partition surface portion 34c and is thereby axially exposed from the partition surface portion 34c. In this way, like in the above-described instance of FIG. 9, there is no need to assemble the magnetic conductors 46, and there is no component interference between the assembled members. Additionally, it is possible to fill with the magnetic members without forming a gap between each magnetic conductor 46 and its surrounding.

Furthermore, in the above embodiment, the material of the sealing plate 34 and the material of the magnetic conductors 46 are different from each other. Alternatively, as shown in FIG. 11, the sealing plate 34 and the magnetic conductors 46 may be made from one common material. For example, there may be used an SUS plate material, a property of which can be changed between a magnetic phase and a non-magnetic phase by applying heat or stress to the material. In such a case, there may be formed the sealing plate 34 that has a plurality of magnetic conducting parts (serving as the plurality of magnetic conducting portions) 46x formed integrally in one-piece with the sealing plate 34 by, for example, demagnetizing a part of the magnetic SUS plate material, which is other than the magnetic conducting parts 46x, or magnetizing the magnetic conducting parts 46x in the non-magnetic SUS plate material. In this way, the number of the components can be reduced.

Further, the present disclosure is not limited to the above embodiment where the thin wall portion 34e is provided at each installation recess 34d, and the sealing plate 34 is formed as a complete sealing member by itself. For example, as shown in (a)-(b) of FIG. 12, there may be provided the sealing plate 34 that has the installation holes 34f but does not have the thin wall portions 34e. Then, a cover member 36, which is in a form of a thin plate and has a fitting recess 36a shaped in a bottomed cylindrical form, may be installed to an outer side of the recessed segment 34b of the sealing plate 34 (in this instance, a part of the recessed segment 34b closer to the driven-side rotatable body 47). In this way, at least the installation holes 34f are closed by the cover member 36, so that the sealing plate 34 and the cover member 36 can implement the complete sealing function without a need for sealing around each magnetic conductor 46.

Furthermore, the present disclosure is not limited to the above embodiment where the magnetic conductors 46, which are formed in advance, are individually assembled to the sealing plate 34. For example, as shown in (a)-(c) of FIG. 13, each circumferentially adjacent two of the magnetic conductors 46 may be joined together by a corresponding one of connecting portions 46a, 46b, 46c each of which has a small width, so that the magnetic conductors 46 are formed integrally in one-piece as a single component. In FIG. 13, (a) shows an example where radially inner end portions of the magnetic conductors 46 are joined together by the connecting portions 46a. In FIG. 13, (b) shows an example where radially intermediate portions of the magnetic conductors 46 are joined together by the connecting portions 46b. In FIG. 13, (c) shows an example where radially outer end portions of the magnetic conductors 46 are joined together by the connecting portions 46c. When the magnetic conductors 46 are formed integrally in one-piece as the single component, it is advantageous at the time of assembling the magnetic conductors 46 to the sealing plate 34 and/or advantageous in terms of management of the components. Here, it should be noted that the width of the respectively connecting portions 46a-46c is made small to increase the magnetic resistance of the connecting portions 46a-46c. Specifically, by substantially magnetically separating each adjacent magnetic conductors 46 from each other, the same performance as that of the above embodiment can be obtained.

Furthermore, in (a)-(b) of FIG. 20, a predetermined number of magnetic conductors 46, which are arranged in the circumferential direction, are assembled to the sealing plate 34. Each of the magnetic conductors 46 is formed generally in an L-shape such that the magnetic conductor 46 extends from the partition surface portion 34c, which forms the bottom surface portion of the recessed segment 34b, to a peripheral surface portion 34g, which forms a peripheral surface portion of the recessed segment 34b. Each magnetic conductor 46 has: a conducting section 46d, which is located at the partition surface portion 34c and performs substantial magnetic conduction; and a peripheral wall section 46e, which is bent substantially perpendicular to the conducting section 46d and is located at the peripheral surface portion 34g. The conducting section 46d and the peripheral wall section 46e are bent relative to each other by a substantially right angle at a bent section 46f located between the conducting section 46d and the peripheral wall section 46e. The bent section 46f of the magnetic conductor 46 corresponds to a bent portion 34h located between the partition surface portion 34c and the peripheral surface portion 34g at the recessed segment 34b of the sealing plate 34.

Here, there will be described a situation where a bending area, which is located at an inside of a recess of the bent portion 34h of the recessed segment 34b of the sealing plate 34, and a bending area, which is located at an inside of a recess of the bent section 46f of the magnetic conductor 46, respectively form a stress concentrating portion. The sealing plate 34 is made of the non-magnetic metal or the non-magnetic resin. The magnetic conductors 46 are made of the magnetic metal. The strength (endurance) of the magnetic conductors 46 is higher than the strength (endurance) of the sealing plate 34. In other words, the strength (endurance) of the sealing plate 34 is lower than that of the magnetic conductors 46. Now, it is assumed that a curvature of the bending area, which is located at the inside of the recess of the bent portion 34h of the sealing plate 34, and a curvature of the bending area, which is located at the inside of the recess of the bent section 46f of the magnetic conductor 46, are equal to each other, and an inner peripheral surface of the recessed segment 34b is smooth and flush in the circumferential direction. In such a case, the equal amount of stress concentration may occur at each of the above-described bending areas. Then, a burden on the non-magnetic portion of the recessed segment 34b of the sealing plate 34, which does not have the magnetic conductor 46 and thereby has a relatively low strength, is relatively large. This will lead to relatively early damage, which starts from the non-magnetic portion, so that it may possibly deteriorate the pressure-resistant strength of the sealing plate 34, which receives the pressure of the refrigerant.

In view of this point, although it is slightly exaggerated in FIG. 20, in this instance, the curvature of the bending area of the bent portion 34h of the sealing plate 34, which is made of the non-magnetic material and has the relatively low strength, is set to be larger than the curvature of the bending area of the bent section 46f of each magnetic conductor 46, which is made of the magnetic material and has the relatively high strength. Specifically, the shape of the bent portion 34h of the sealing plate 34 and the shape of the bent section 46f of each magnetic conductor 46 are set such that the stress concentration is more likely to occur in the bent section 46f of the magnetic conductor 46 than in the bent portion 34h of the sealing plate 34, and the member, more specifically the magnetic conductor 46, which has the high strength, is used to receive the stress. The pressure-resistant strength is comprehensively increased in the sealing plate 34 which includes the magnetic conductors 46.

Furthermore, (a)-(b) of FIG. 21 show another example. In this example. in the sealing plate 34, among the non-magnetic portion, which has the relatively low strength, and the magnetic conductors 46, which have the relatively high strength, the magnetic conductors 46 are respectively shaped such that the magnetic conductor 46 is likely to have a stress concentration. In this instance, it is assumed that the sealing plate 34 has a planar plate form, and the magnetic conductors 46 respectively have a substantially rectangular parallelepiped form, and a radially inner end portion (serving as a stress concentrating point) 46g of each magnetic conductor 46 and an adjacent portion of the sealing plate 34, which is adjacent to the radially inner end portion 46g, respectively form a stress concentrating portion. Here, there is assumed a case where the magnetic conductors 46 are installed in the installation holes 34i of the sealing plate 34, and the sealing plate 34 is flush with each of the magnetic conductors 46. In such a case, when the equal stress concentration occurs at the radially inner end portion 46g of the magnetic conductor 46 and the adjacent portion of the sealing plate 34, a burden on the adjacent portion of the sealing plate 34, which is adjacent to the magnetic conductor 46 and has the relatively low strength, is relatively large.

In view of this point, although it is slightly exaggerated in FIG. 21, in this instance, a recess 34j is formed at the sealing plate 34, which is made of the non-magnetic material and has the relatively low strength, such that the recess 34j extends continuously in the circumferential direction of the sealing plate 34 and includes a portion of each of the installation holes 34i, which is adjacent to the radially inner end portion 46g of the corresponding magnetic conductor 46. The recess 34j is shaped in a form of a smooth curved surface that is arcuately recessed in a cross section thereof, and thereby the recess 34j is not flush with the surface of the radially inner end portion 46g of each of the magnetic conductors 46. That is, the sealing plate 34 is shaped such that the stress concentration is likely to occur preferentially at the radially inner end portion 46g of each of the magnetic conductors 46 rather than the adjacent portion of the sealing plate 34, which is adjacent to the radially inner end portion 46g, and thereby the stress is received by the member which has the high strength. Even in the case of such a sealing plate 34 having the magnetic conductors 46, the pressure-resistant strength of the sealing plate 34 is comprehensively increased.

Furthermore, the sealing plate 34 shown in (a)-(b) of FIG. 22 is provided with the magnetic conductors 46, each of which is shaped in a substantially L-shape and has the conducting section 46d and the peripheral wall section 46e. In each magnetic conductor 46, the conducting section 46d performs the substantial magnetic conduction, and the peripheral wall section 46e is bent from the conducting section 46d. The sealing plate 34 and the magnetic conductors 46 are integrally assembled such that the conducting section 46d of each magnetic conductor 46 is located at the partition surface portion 34c of the recessed segment 34b, and the peripheral wall section 46e of each magnetic conductor 46 is located at the peripheral surface portion 34g of the recessed segment 34b. In the sealing plate 34 of this instance, the inner peripheral surface of the recessed segment 34b is substantially smooth and is substantially flush with the surface of each of the magnetic conductors 46. Furthermore, although the sealing plate 34 is fixed such that the peripheral plate portion 34a is clamped between the housing 42 of the drive device 32 and the base block 31, an extension piece (serving as an extension) 46h, which is formed integrally with and extends from the peripheral wall section 46e in each magnetic conductors 46, is placed at the inside of the peripheral plate portion 34a. The extension piece 46h is formed at an end portion of the peripheral wall section 46e, which is opposite to the conducting section 46d, and the extension piece 46h extends from the peripheral wall section 46e in a direction that is opposite to the conducting section 46d. The extension piece 46h is exposed to the base block 31 and directly contacts the base block 31. Furthermore, the extension piece 46h is covered with a portion of the sealing plate 34, and this covered portion of the extension piece 46h contacts the housing 42.

Specifically, the sealing plate 34 of this instance is constructed such that the extension piece 46h, which is the portion of the relatively strong magnetic conductor 46, is placed at the fixing portion of the sealing plate 34, so that the magnetic conductors 46 support the sealing plate 34, particularly the recessed segment 34b, which receives the pressure of the refrigerant. As discussed above, in the sealing plate 34 of this instance, the magnetic conductors 46 also function as a skeleton of the sealing plate 34, and an improvement in the pressure-resistant strength of the sealing plate 34 can be expected.

Furthermore, in the sealing plate 34 shown in (a)-(b) of FIG. 23, the extension piece 46h of each magnetic conductor 46 is exposed to the housing 42 at the peripheral plate portion 34a and directly contacts the housing 42. Furthermore, an insertion piece (serving as a fitting portion) 46i is formed integrally with the extension piece 46h, and a fitting hole 42a, which corresponds to the insertion piece 46i, is formed at the end surface of the housing 42. The insertion pieces 46i of the sealing plate 34, which function as projections at the time of installing the housing 42, are fitted into the fitting holes 42a at the end surface of the housing 42 to form male-female couplings, so that the coupling between the sealing plate 34 and the housing 42 is strengthened. Even in this way, an improvement in the pressure-resistant strength of the sealing plate 34 can be expected. Here, the extension piece 46h of the magnetic conductor 46 may be exposed from the peripheral plate portion 34a of the sealing plate 34 and directly contact the base block 31. Alternatively, the extension piece 46h of the magnetic conductor 46 may not directly contact the base block 31 in a case where another member is interposed between the extension piece 46h and the base block 31.

Figure 24:
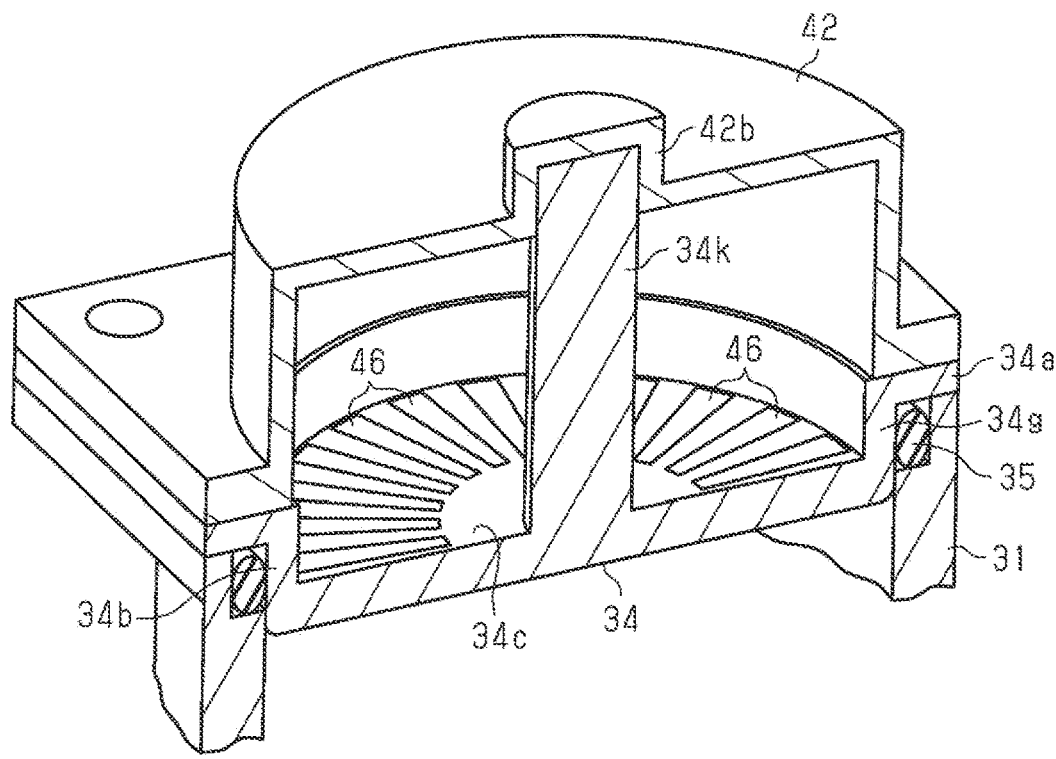
FIG. 24 is a structural diagram showing a sealing plate provided with magnetic conductors in another modification.

Furthermore, in the structure including the sealing plate 34 shown FIG. 24, a support column (serving as a support portion) 34k is formed integrally with the sealing plate 34 in one-piece such that the support column 34k projects from a center of the sealing plate 34, and a distal end portion of the support column 34k is inserted in an installation recess 42b that is formed at an upper bottom surface portion of the housing 42. Specifically, there is implemented the structure where the partition surface portion 34c of the recessed segment 34b, which particularly receives the pressure of the refrigerant, is supported by the support column 34k and the housing 42, so that an improvement in the pressure-resistant strength of the sealing plate 34 can be expected.

Figure 25:
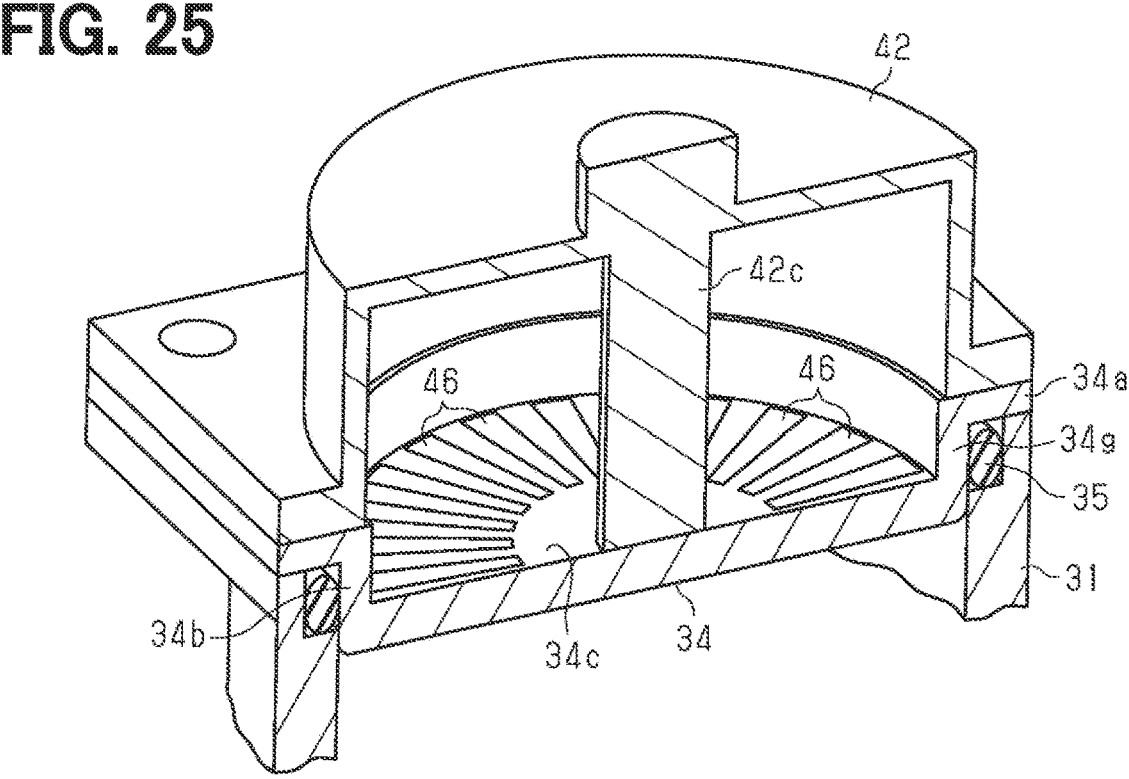
FIG. 25 is a structural diagram showing a sealing plate provided with magnetic conductors in another modification.

Furthermore, in the structure including the sealing plate 34 shown in FIG. 25, a support column (serving as a support portion) 42c is formed integrally with the housing (serving as a peripheral member placed around the sealing plate) 42 in one-piece such that the support column 42c projects from the upper bottom surface portion of the housing 42, and a distal end portion of the support column 42c contacts the center of the partition surface portion 34c of the recessed segment 34b at the sealing plate 34. That is, this is a modification that improves the pressure-resistant strength of the sealing plate 34 by the structure where the partition surface portion 34c of the recessed segment 34b is supported by the support column 42c of the housing 42.

Figure 26:
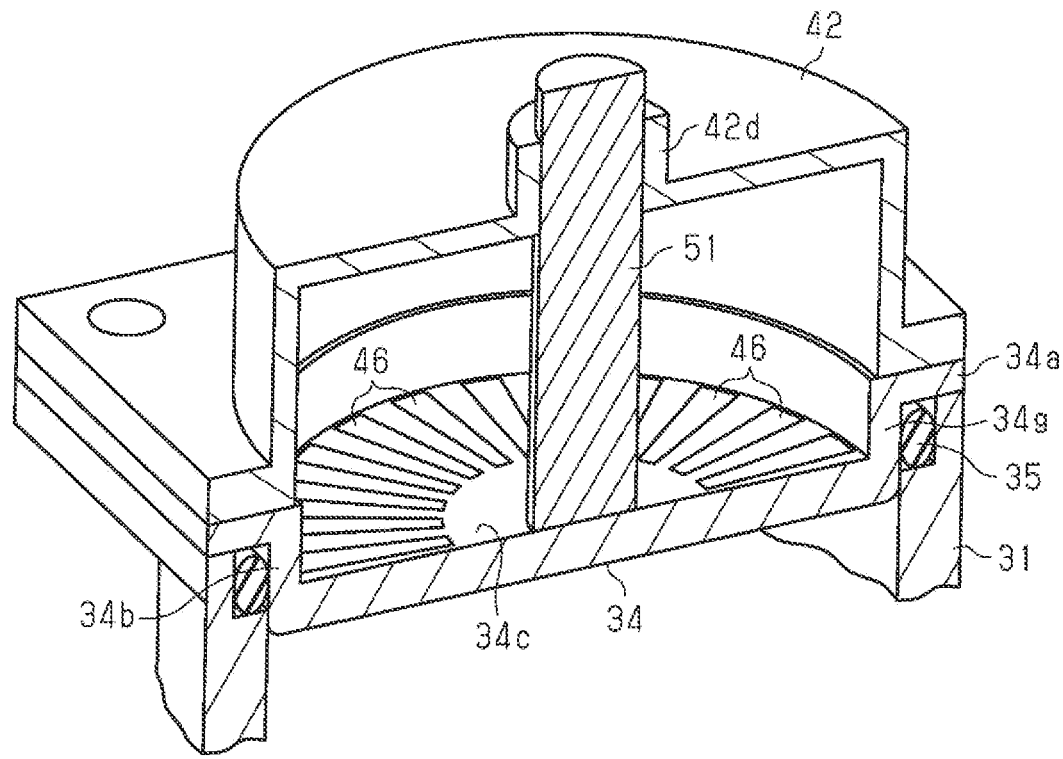
FIG. 26 is a structural diagram showing a sealing plate provided with magnetic conductors in another modification.

Furthermore, in the structure including the sealing plate 34 shown FIG. 26, a support column member (serving as a support portion) 51 is provided in addition to the sealing plate 34 and the housing 42, and the support column member 51 is installed in an installation tube 42d that is formed at the upper bottom surface portion of the housing 42. The support column member 51 can be moved and inserted relative to the installation tube 42d when a force, which is equal to or larger than a predetermined amount, is applied to the support column member 51. Furthermore, the support column member 51 is immovably held relative to the installation tube 42d when the force, which is applied to the support column member 51, is less than the predetermined amount. A distal end portion of the support column member 51 contacts the center of the partition surface portion 34c of the recessed segment 34b of the sealing plate 34, so that the partition surface portion 34c of the recessed segment 34b is supported by the support column member 51. This instance is a modification that improves the pressure-resistant strength of the sealing plate 34 and provides the structure which is configured to adjust the insertion position of the support column member 51. Thus, it is possible to easily deal with circumstances such as individual dimensional errors.

Figure 27:
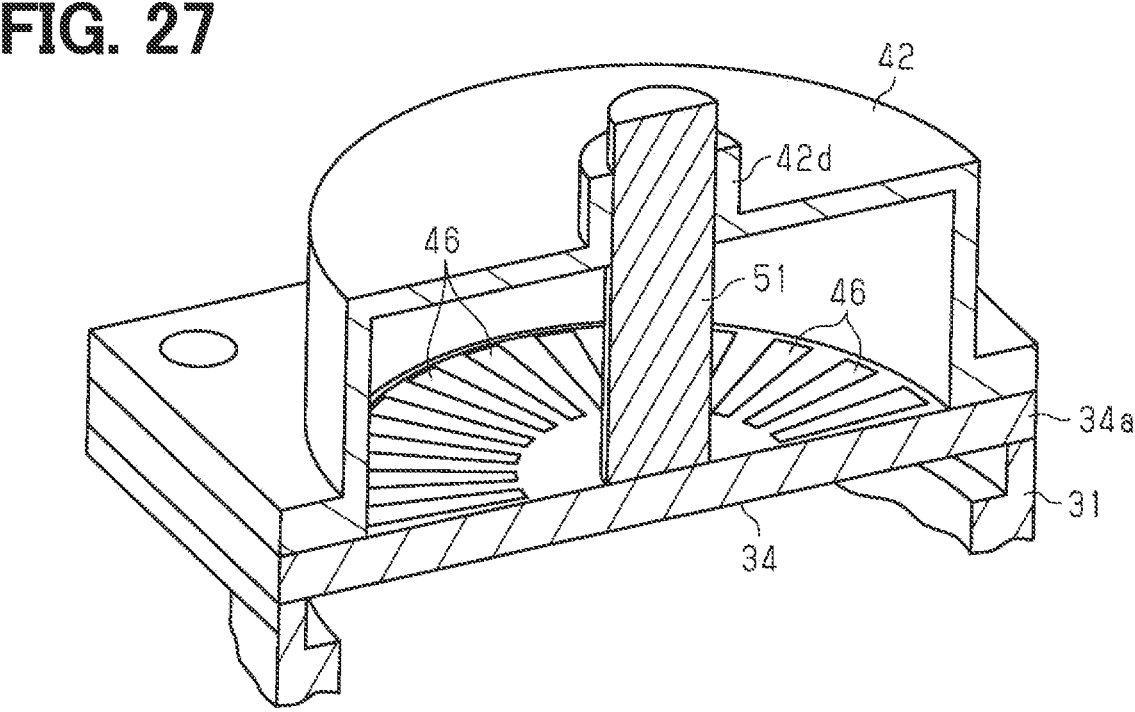
FIG. 27 is a structural diagram showing a sealing plate provided with magnetic conductors in another modification.

Furthermore, in the structure including the sealing plate 34 shown FIG. 27, the support column member 51 is used like in the above instance, and the distal end portion of the support column member 51 contacts the center of the sealing plate 34 shaped in a planar plate form and is thereby supported by the sealing plate 34. Therefore, this is a modification that improves the pressure-resistant strength of the sealing plate 34. The internal structure of the housing 42 in the above-described instances of FIGS. 24 to 27 is omitted to avoid complication of the drawings.

Figure 28:
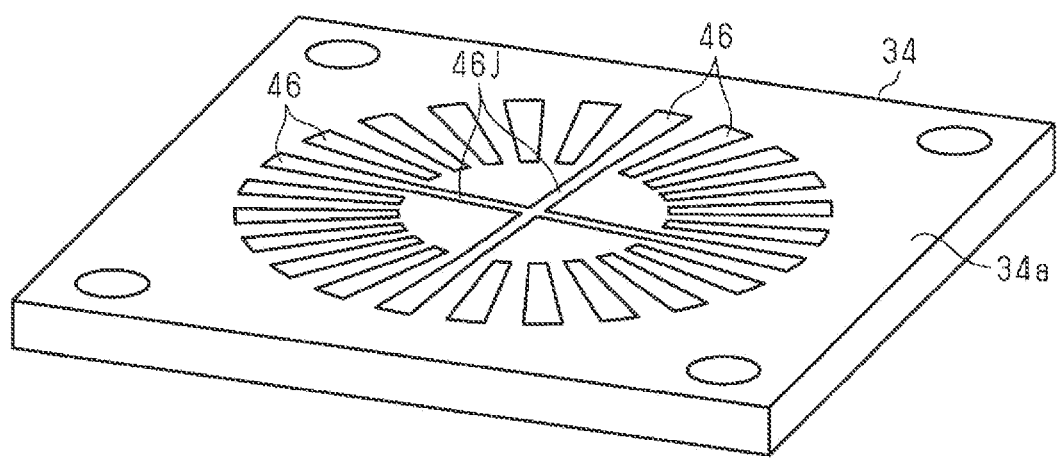
FIG. 28 is a structural diagram showing a sealing plate provided with magnetic conductors in another modification.

In the sealing plate 34 shaped in the planar plate form shown in FIG. 28, among the predetermined number of the magnetic conductors 46 arranged in the circumferential direction, each corresponding two of the magnetic conductors 46, which are phase shifted relative to each other by an electrical angle of 360 degrees, i.e., are shifted relative to each other by a mechanical angle of 90 degrees in FIG. 28, are joined together by a connecting portion 46j at the radially inner side of the sealing plate 34. The connecting portion 46j has a cross shape, and an intersection of this cross-shaped connecting portion 46j is located at the center of the sealing plate 34. The connecting portion 46j can be expected to increase the strength of the sealing plate 34 without generating a magnetic influence to improve the pressure-resistant strength of the sealing plate 34.

Figure 29:
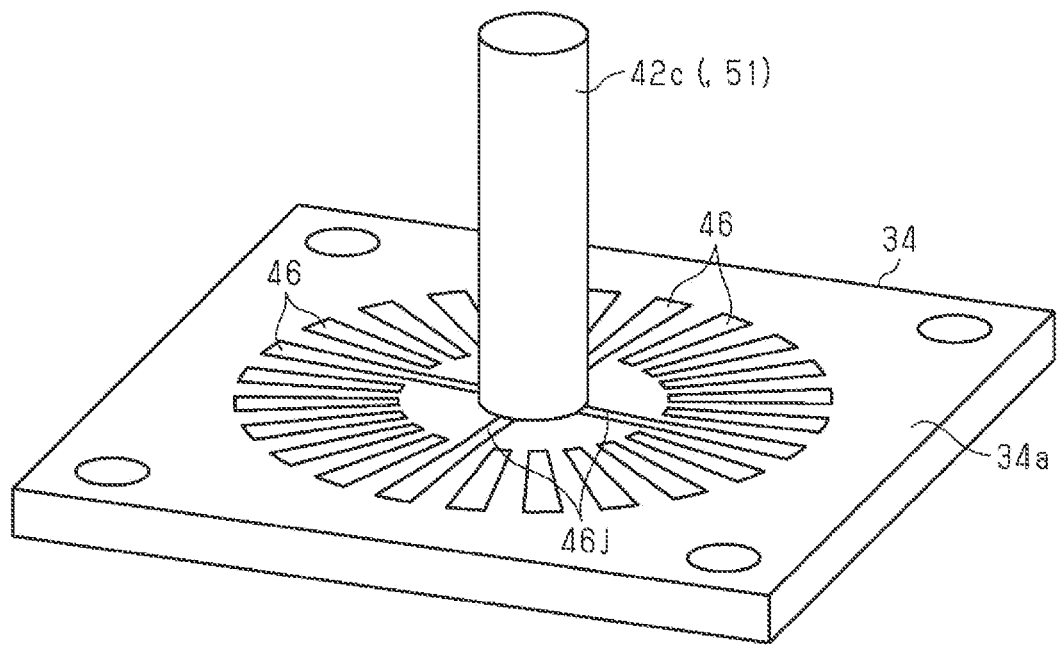
FIG. 29 is a structural diagram showing a sealing plate provided with magnetic conductors in another modification.

Furthermore, in the sealing plate 34 shaped in the planar plate form shown in FIG. 29, the center of the sealing plate 34, at which the intersection of the cross-shaped connecting portion 46j for the magnetic conductors 46 is located, contacts the distal end portion of the support column 42c formed integrally with the housing 42 in the instance shown in FIG. 25 or the distal end portion of the support column member 51 installed in the housing 42 in the instances shown in FIGS. 26-27. As a result, further improvement in the pressure-resistant strength of the sealing plate 34 can be expected.

Figure 30:
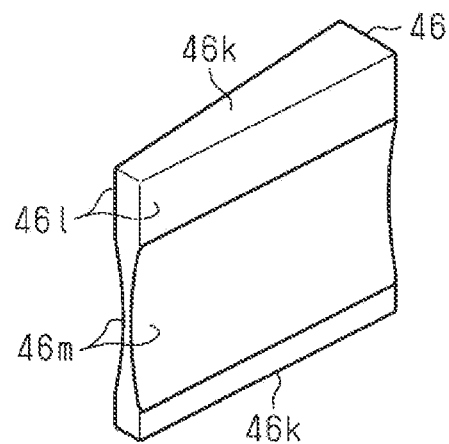
FIG. 30 is a structural diagram showing a magnetic conductor in another modification.
Figure 31:
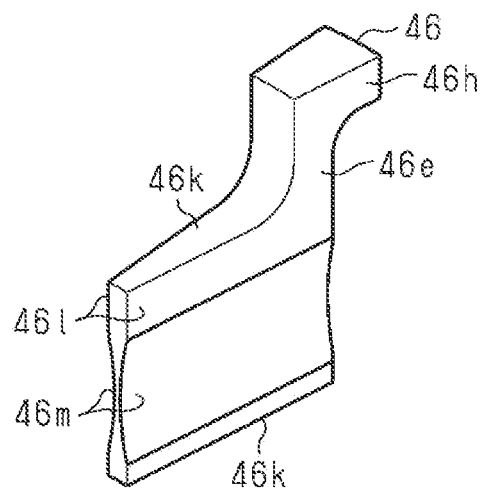
FIG. 31 is a structural diagram showing a magnetic conductor in another modification.
Figure 32:
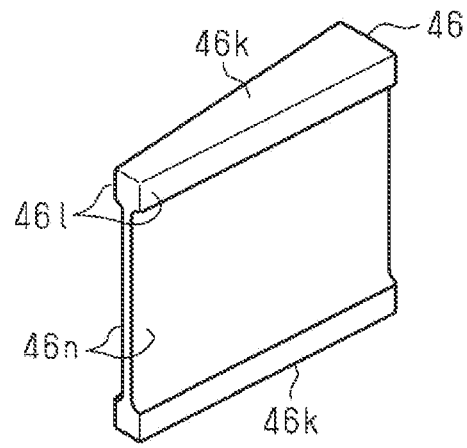
FIG. 32 is a structural diagram showing a magnetic conductor in another modification.

Furthermore, in a case where the thickness of the sealing plate 34 is increased to increase the pressure-resistant strength of the sealing plate 34, it is necessary to increase the height of the magnetic conductors 46, as shown in FIGS. 30, 31 and 32. The locations of the magnetic conductors 46 in the circumferential direction are determined based on the number of the magnetic poles, and thereby a magnetic conduction surface 46k of each magnetic conductor 46 needs to have a required minimum size. Then, there is a concern that the amount of magnetic flux leakage between each circumferentially adjacent two of the magnetic conductors 46 may possibly increase. In view of this point, the magnetic conductor 46 shown in FIG. 30 has two cutouts 46m which are respectively located at two circumferentially opposite side surfaces (serving as opposing surfaces) 46l of the magnetic conductor 46 and are formed by arcuately cutting a portion of each of the side surfaces 46l except two opposite end portions of the magnetic conductor 46 where the magnetic conduction surfaces 46k are respectively located to ensure the required size of each of the magnetic conduction surfaces 46k. In other words, each adjacent two of the magnetic conductors 46 have two opposing surfaces 46l, respectively, which are opposed to each other, and a portion of each of these opposing surfaces 46l is cut to form the cutout 46m. The magnetic conductor 46 shown in FIG. 31 has the peripheral wall section 46e and the extension piece 46h and also has the two cutouts 46m which are formed by arcuately cutting a portion of each of the two side surfaces 46l. The magnetic conductor 46 shown in FIG. 32 has two cutout 46n which are formed by cutting a portion of each of the side surfaces 46l in a rectangular form. A required gap between each circumferentially adjacent two of the magnetic conductors 46 is ensured by these cutout 46m, 46n to limit the magnetic flux leakage.

Next, modifications of the drive-side rotatable body 45 and the driven-side rotatable body 47 will be described.

Figure 14:
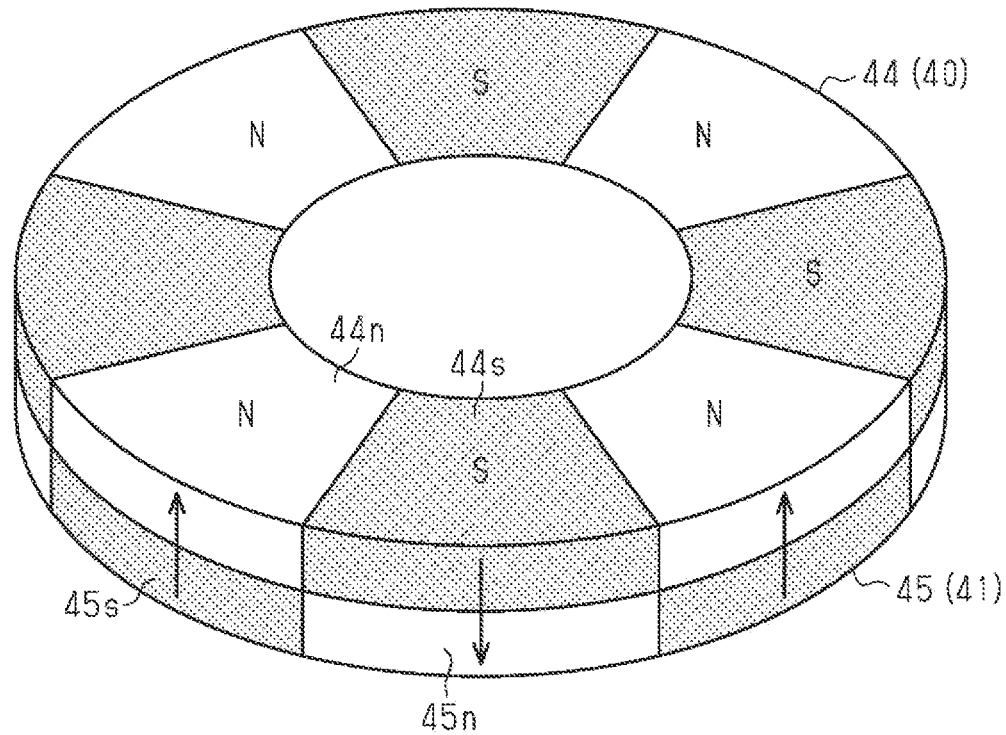
FIG. 14 is a structural diagram showing a rotor and a drive-side rotatable body in another modification.

Although a magnetizing mode of the magnetic poles 45n, 45s of the drive-side rotatable body 45 is not particularly mentioned, the magnetic poles 45n, 45s of the drive-side rotatable body 45 may be axially magnetized, as shown in FIG. 14. Also, the magnetizing mode of the magnetic poles 44n, 44s of the rotor 44 of the electric motor 40 may be such that the magnetic poles 44n, 44s of the rotor 44 are axially magnetized. Here, even in the case where the number of magnetic poles 45n, 45s of the drive-side rotatable body 45 and the number of the magnetic poles 44n, 44s of the rotor 44 are equal to each other, the magnetic plate 50 shown in FIG. 2 may be placed between the rotor 44 and the drive-side rotatable body 45, or the magnetic plate 50 shown in FIG. 2 may be eliminated between the rotor 44 and the drive-side rotatable body 45. In the case where the magnetic plate 50 is eliminated, different magnet components may be used to form the rotor 44 and the drive-side rotatable body 45, respectively. Alternatively, a single magnet component may be used to form both the rotor 44 and the drive-side rotatable body 45.

Figure 15:
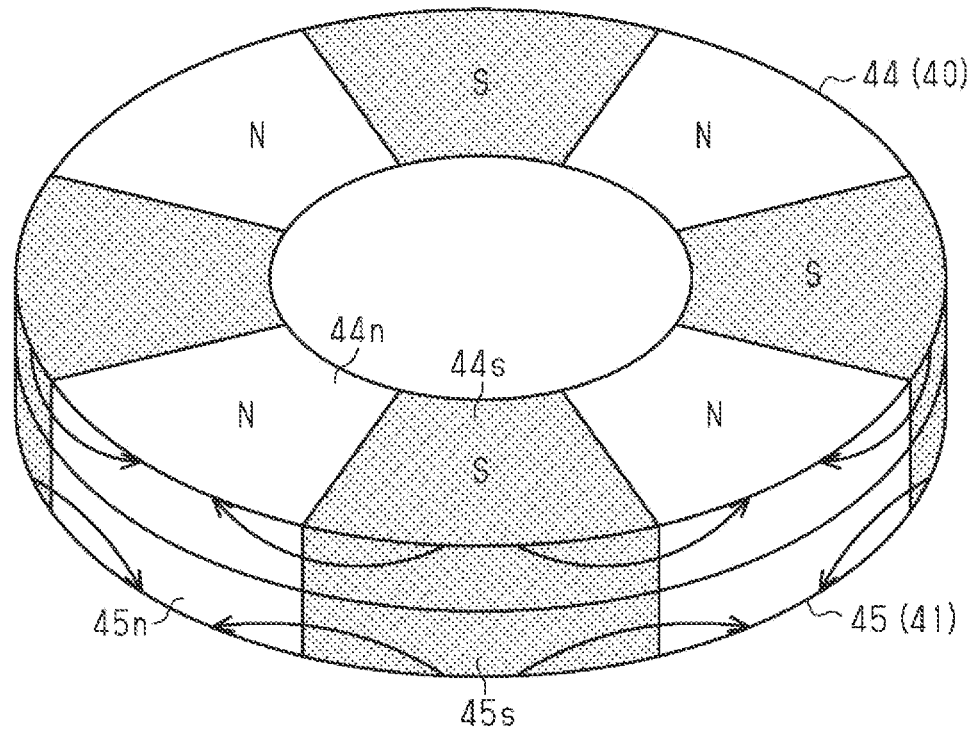
FIG. 15 is a structural diagram showing a rotor and a drive-side rotatable body in another modification.

Further, the magnetizing mode of the magnetic poles 45n, 45s of the drive-side rotatable body 45 may be such that the magnetic poles 45n, 45s are formed by polar anisotropic magnetization to provide the magnetic poles 45n, 45s at required surface sections of the drive-side rotatable body 45, as shown in FIG. 15. The magnetizing mode of the magnetic poles 44n, 44s of the rotor 44 may be the polar anisotropic magnetization. Even in the case of the polar anisotropic magnetization, the magnetic plate 50 shown in FIG. 2 may be placed between the rotor 44 and the drive-side rotatable body 45, or the magnetic plate 50 shown in FIG. 2 may be eliminated between the rotor 44 and the drive-side rotatable body 45. In the case where the magnetic plate 50 is eliminated, the different magnet components may be used to form the rotor 44 and the drive-side rotatable body 45, respectively. Alternatively, the single magnet component may be used to form both the rotor 44 and the drive-side rotatable body 45.

Furthermore, in the case where the magnetic poles 45n, 45s of the drive-side rotatable body 45 and the magnetic poles 44n, 44s of the rotor 44 are formed integrally in one-piece, it is preferred that the magnetic forces of the magnetic poles of the drive side are larger than the magnetic forces of the magnetic poles 47n, 47s of the driven-side rotatable body 47. This is due to the fact that the magnetic forces of the magnetic poles of the drive side need to have both the magnetic forces, which are used as the magnetic forces of the rotor 44, and the magnetic forces, which are used for the magnetic coupling. As a means for increasing the magnetic forces, the thickness of the magnet material in the axial direction may be increased in the case where the common magnet material is used, or a strong magnet material may be used in the case where the axial thickness of the magnet material is equally set.

Figure 16:
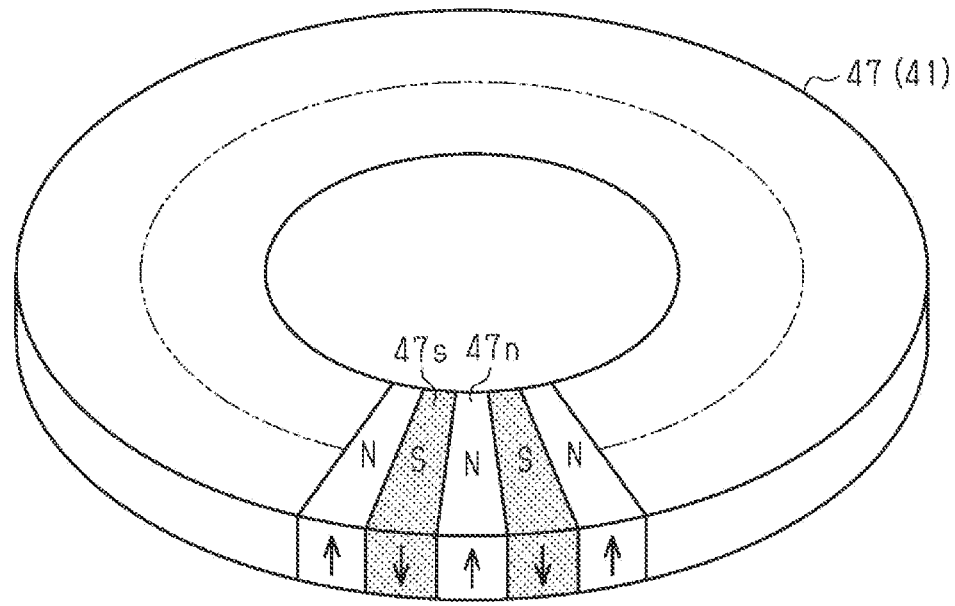
FIG. 16 is a structural diagram showing a driven-side rotatable body in another modification.
Figure 17:
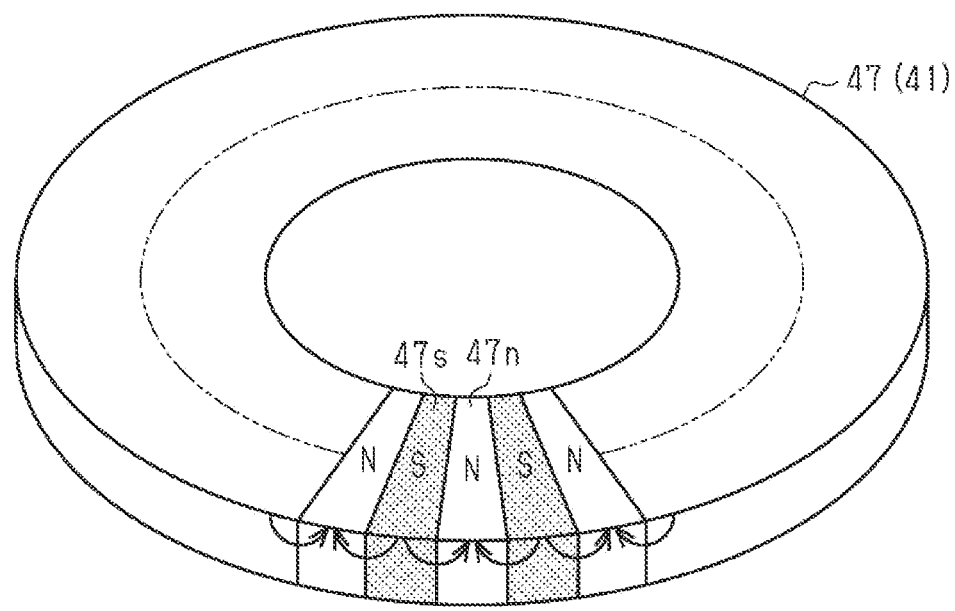
FIG. 17 is a structural diagram showing a driven-side rotatable body in another modification.

Although the magnetizing mode of the magnetic poles 47n, 47s of the driven-side rotatable body 47 is not mentioned, the magnetic poles 47n, 47s may be axially magnetized, as shown in FIG. 16, or the magnetic poles 47n, 47s may be formed by the polar anisotropic magnetization to provide the magnetic poles 47n, 47s at required surface sections of the driven-side rotatable body 47, as shown in FIG. 17.

Next, as another modification which is different from the above-described modifications, the following modification may be applied. Specifically, in the above embodiment, the drive-side rotatable body 45, the magnetic conductors 46 and the driven-side rotatable body 47 are opposed to each other in the axial direction. Alternatively, the drive-side rotatable body 45, the magnetic conductors 46 and the driven-side rotatable body 47 may be opposed to each other in the radial direction. In this case, it is required to change, for example, the shape of the sealing plate 34. For instance, a portion of the sealing plate 34 may be interposed between, for example, the magnetic conductors 46 and the driven-side rotatable body 47 which are opposed to each other in the radial direction.

The structure of the drive device 32 of the above embodiment is one example and may be appropriately changed.

Figure 18:
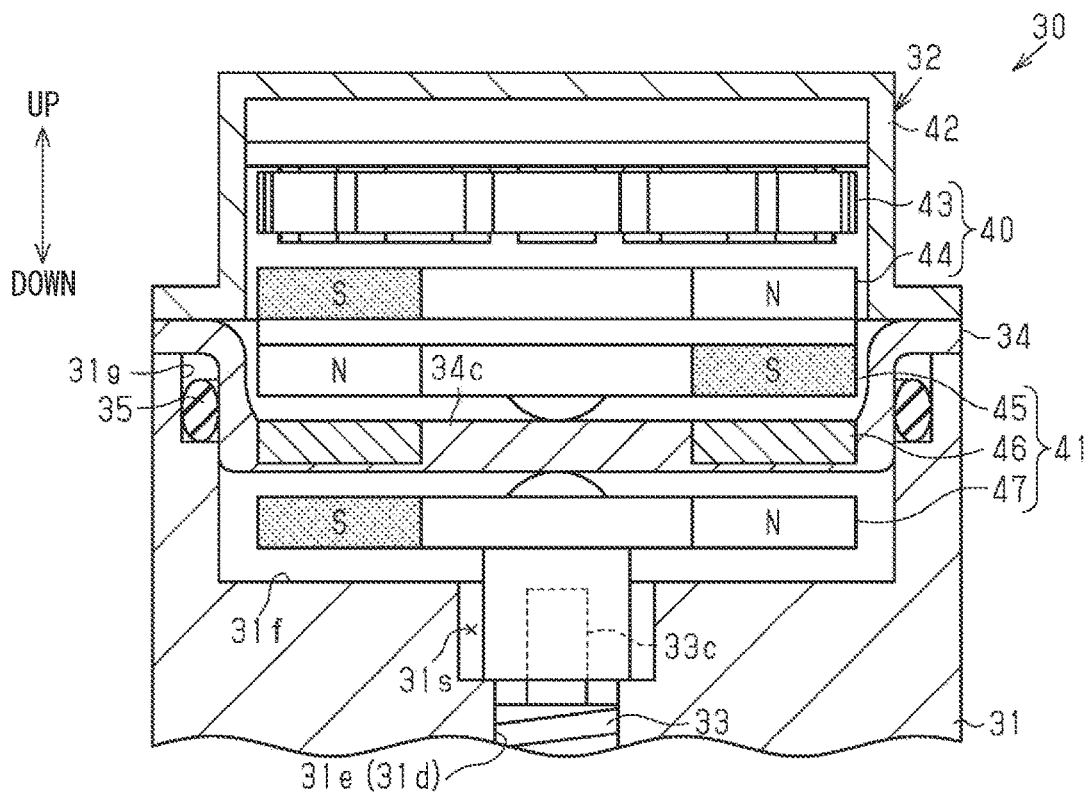
FIG. 18 is a structural diagram showing a drive device in another modification.

Although a support, which rotatably supports the driven-side rotatable body 47, is not particularly mentioned, like in the embodiment shown in FIG. 2, the driven-side rotatable body 47 may be directly supported by a portion of the base block 31, which radially opposes the driven-side rotatable body 47, or the driven-side rotatable body 47 may be supported by the base block 31 through a bearing (not shown). Furthermore, as shown in FIG. 18, a gap 31s may be formed at the portion of the base block 31, which is radially opposed the driven-side rotatable body 47, to allow a positional deviation of the driven-side rotatable body 47 in the radial direction. Since the driven-side rotatable body 47 is magnetically coupled with the drive-side rotatable body 45 through the magnetic conductors 46, the driven-side rotatable body 47 can be rotated without generating a large positional deviation of the driven-side rotatable body 47. In this way, it is possible to allow the positional deviation of the axis of the driven-side rotatable body 47. Here, even when the driven-side rotatable body 47 is deviated in the radial direction, the structure is configured to maintain the coupling of the driven-side rotatable body 47 relative to the valve element 33.

Figure 19:
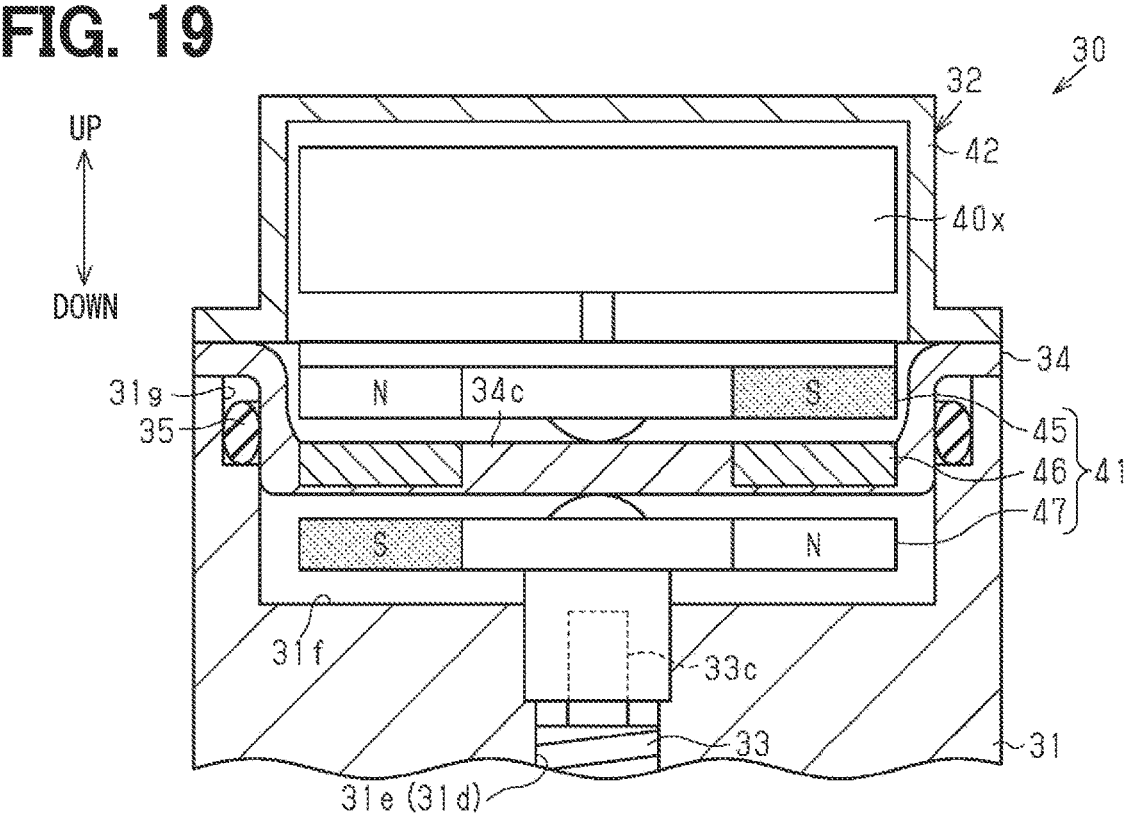
FIG. 19 is a structural diagram showing a drive device in another modification.

In the above embodiment, the stator 43 and the rotor 44, which are the components of the electric motor 40, are received at the inside of the housing 42. Alternatively, as shown in FIG. 19, a finished electric motor 40x may be received in the housing 42, and the drive-side rotatable body 45 of the drive transmission device 41 may be rotated by the electric motor 40x.

The above embodiment may be further appropriately modified besides the above-described modifications.

In the expansion valve device 30 of the above embodiment, the base block 31 is placed at the lower side, and the drive device 32 is placed at the upper side. However, the structure of the expansion valve device 30 is not limited to this one and may be appropriately modified.

The drive transmission device 41 is operated as the magnetic speed reducer in the above embodiment. Alternatively, the drive transmission device 41 may be operated as a magnetic speed changer that is configured to change, i.e., increase or decrease the speed of the rotation between the drive-side rotatable body 45 and the driven-side rotatable body 47.

In the above embodiment, the drive transmission device is applied to the expansion valve device 30 of the refrigeration cycle device D for the vehicle air conditioning apparatus. Alternatively, the drive transmission device of the present disclosure may be used in a drive device of a valve device, which is provided in another apparatus other than the air conditioning apparatus or is other than the expansion valve, or another device for driving a drive subject other than the valve, i.e., a drive device other than the valve device, or a drive transmission device that does not have the electric motor.

Although the present disclosure has been described in view of the embodiment, it is understood that the present disclosure is not limited to the embodiment and the structure described therein. The present disclosure also includes various variations and variations within an equivalent range. In addition, various combinations and forms, as well as other combinations and forms that include only one element, more, or less, are within the scope and idea of the present disclosure.

What is claimed is:

1. A drive device comprising:
an electric motor that is configured to be rotated;
a drive transmission device that is configured to transmit a rotational drive force from the electric motor serving as a drive side to a driven side and is configured to operate as both:
 a magnetic coupler, which is configured to implement contactless magnetic coupling between a drive-side rotatable body and a driven-side rotatable body through a partition wall member; and
 a speed changer, which is configured to change a speed of rotation to be transmitted to a driven object, wherein the drive transmission device includes:
the drive-side rotatable body that has a plurality of magnetic poles arranged in a rotational direction of the drive-side rotatable body;
a plurality of magnetic conducting portions that are arranged in the rotational direction and are magnetically separated from each other, wherein the plurality of magnetic conducting portions are magnetizable by the plurality of magnetic poles of the drive-side rotatable body; and
the driven-side rotatable body that has a plurality of magnetic poles arranged in the rotational direction, wherein the driven-side rotatable body is configured to be rotated in response to rotation of the plurality of magnetic poles of the drive-side rotatable body through the plurality of magnetic conducting portions, wherein:
a number of the plurality of magnetic poles of the drive-side rotatable body, a number of the plurality of magnetic conducting portions and a number of the plurality of magnetic poles of the driven-side rotatable body are set to be different from each other, and thereby the drive transmission device is also configured to operate as a magnetic speed changer that is configured to change the speed of the rotation between the drive-side rotatable body and the driven-side rotatable body;
the plurality of magnetic conducting portions are integrated in the partition wall member;
the drive-side rotatable body, the plurality of magnetic conducting portions and the driven-side rotatable body are arranged to oppose each other in an axial direction;
the partition wall member has a recessed segment that is formed at a portion of the partition wall member;
the plurality of magnetic conducting portions are provided at a bottom surface portion of the recessed segment of the partition wall member;
the recessed segment of the partition wall member has the bottom surface portion and a peripheral surface portion;
each of the plurality of magnetic conducting portions has:
 a conducting section, which is located at the bottom surface portion of the recessed segment and performs substantial magnetic conduction; and
 a peripheral wall section, which is bent substantially at a right angle relative to the conducting section and is located at the peripheral surface portion; and
a curvature of a bent portion, which is located between the bottom surface portion and the peripheral surface portion at the recessed segment of the partition wall member, is larger than a curvature of a bent section, which is located between the conducting section and the peripheral wall section at each of the plurality of magnetic conducting portions.

2. The drive device according to claim 1, wherein:
the partition wall member has a plurality of recesses or a plurality of through-holes;
the plurality of magnetic conducting portions are formed as a plurality of magnetic conductors made of a magnetic metal material; and
the plurality of magnetic conductors are installed in the plurality of recesses or the plurality of through-holes, respectively.

3. The drive device according to claim 1, wherein:
the partition wall member has a plurality of recesses or a plurality of through-holes; and
the plurality of magnetic conducting portions are formed as a plurality of magnetic conductors that are made of a magnetic metal material and are directly molded in the plurality of recesses or the plurality of through-holes, respectively.

4. The drive device according to claim 3, wherein:
the partition wall member has the plurality of through-holes;
the plurality of magnetic conductors are installed in the plurality of through-holes, respectively; and
the partition wall member includes a cover member that is installed to the partition wall member to at least close the plurality of through-holes.

5. The drive device according to claim 1, wherein:
the plurality of magnetic conducting portions are formed as a plurality of magnetic conductors made of a magnetic metal material; and the partition wall member is made of a non-magnetic resin material and is molded relative to the plurality of magnetic conductors.

6. The drive device according to claim 2, wherein the plurality of magnetic conductors are formed integrally in one-piece while each adjacent two of the plurality of magnetic conductors are joined together by a connecting portion.

7. The drive device according to claim 2, wherein the partition wall member has a recess which is shaped in a curved surface form and is located around a stress concentrating area of each of the plurality of magnetic conducting portions.

8. The drive device according to claim 1, wherein:
the partition wall member has a peripheral plate portion that is used to fix the partition wall member relative to a fixation-subject member; and
each of the plurality of magnetic conducting portions has an extension that extends into the peripheral plate portion.

9. The drive device according to claim 8, wherein:
each of the plurality of magnetic conducting portions has a fitting portion that is formed at the extension; and
the partition wall member is fitted to the fixation-subject member through the fitting portion of each of the plurality of magnetic conducting portions.

10. The drive device according to claim 1, wherein:
corresponding two of the plurality of magnetic conducting portions, which are shifted relative to each other by an electrical angle of 360 degrees, are joined together by a connecting portion to increase a strength of the partition wall member.

11. The drive device according to claim 10, wherein the partition wall member is supported by a support portion, which is provided to one of the partition wall member and a peripheral member placed around the partition wall member, to limit deformation of the partition wall member.

12. The drive device according to claim 11, wherein a portion of the partition wall member, at which the connecting portion is placed, is supported by the support portion, which is provided to the peripheral member.

13. The drive device according to claim 1, wherein each adjacent two of the plurality of magnetic conducting portions have two opposing surfaces, respectively, which are opposed to each other, and a portion of each of the two opposing surfaces is cut to form a cutout.

14. The drive device according to claim 1, wherein:
the partition wall member is made of a material that has a property which is changeable between a magnetic phase and a non-magnetic phase upon application of heat or stress to the material; and
each of the plurality of magnetic conducting portions is formed as a magnetic conducting part of the partition wall member by changing the property of a corresponding part of the partition wall member.

15. A drive device comprising:
an electric motor that is configured to be rotated;
a drive transmission device that is configured to transmit a rotational drive force from the electric motor serving as a drive side to a driven side and is configured to operate as both:
a magnetic coupler, which is configured to implement contactless magnetic coupling between a drive-side rotatable body and a driven-side rotatable body through a partition wall member; and
a speed changer, which is configured to change a speed of rotation to be transmitted to a driven object, wherein the drive transmission device includes:
the drive-side rotatable body that has a plurality of magnetic poles arranged in a rotational direction of the drive-side rotatable body;
a plurality of magnetic conducting portions that are arranged in the rotational direction and are magnetically separated from each other, wherein the plurality of magnetic conducting portions are magnetizable by the plurality of magnetic poles of the drive-side rotatable body; and
the driven-side rotatable body that has a plurality of magnetic poles arranged in the rotational direction, wherein the driven-side rotatable body is configured to be rotated in response to rotation of the plurality of magnetic poles of the drive-side rotatable body through the plurality of magnetic conducting portions, wherein:
a number of the plurality of magnetic poles of the drive-side rotatable body, a number of the plurality of magnetic conducting portions and a number of the plurality of magnetic poles of the driven-side rotatable body are set to be different from each other, and thereby the drive transmission device is also configured to operate as a magnetic speed changer that is configured to change the speed of the rotation between the drive-side rotatable body and the driven-side rotatable body;
the plurality of magnetic conducting portions are integrated in the partition wall member; and
the partition wall member has a recess which is shaped in a curved surface form and is located around a stress concentrating area of each of the plurality of magnetic conducting portions.

16. A drive device comprising:
an electric motor that is configured to be rotated;
a drive transmission device that is configured to transmit a rotational drive force from the electric motor serving as a drive side to a driven side and is configured to operate as both:
a magnetic coupler, which is configured to implement contactless magnetic coupling between a drive-side rotatable body and a driven-side rotatable body through a partition wall member; and
a speed changer, which is configured to change a speed of rotation to be transmitted to a driven object, wherein the drive transmission device includes:
the drive-side rotatable body that has a plurality of magnetic poles arranged in a rotational direction of the drive-side rotatable body;
a plurality of magnetic conducting portions that are arranged in the rotational direction and are magnetically separated from each other, wherein the plurality of magnetic conducting portions are magnetizable by the plurality of magnetic poles of the drive-side rotatable body; and
the driven-side rotatable body that has a plurality of magnetic poles arranged in the rotational direction, wherein the driven-side rotatable body is configured to be rotated in response to rotation of the plurality of magnetic poles of the drive-side rotatable body through the plurality of magnetic conducting portions, wherein:
a number of the plurality of magnetic poles of the drive-side rotatable body, a number of the plurality of magnetic conducting portions and a number of the plurality of magnetic poles of the driven-side rotatable body are set to be different from each other, and thereby the drive transmission device is also configured to operate as a magnetic speed changer that is configured to change the speed of the rotation between the drive-side rotatable body and the driven-side rotatable body;

the plurality of magnetic conducting portions are integrated in the partition wall member;

the partition wall member has a peripheral plate portion that is used to fix the partition wall member relative to a fixation-subject member;

each of the plurality of magnetic conducting portions has an extension that extends into the peripheral plate portion;

each of the plurality of magnetic conducting portions has a fitting portion that is formed at the extension; and the partition wall member is fitted to the fixation-subject member through the fitting portion of each of the plurality of magnetic conducting portions.

\* \* \* \* \*